US006200539B1

(12) United States Patent
Sherman et al.

(10) Patent No.: US 6,200,539 B1
(45) Date of Patent: Mar. 13, 2001

(54) PARAELECTRIC GAS FLOW ACCELERATOR

(75) Inventors: Daniel M. Sherman, Knoxville, TN (US); Stephen P. Wilkinson, Poquoson, VA (US); J. Reece Roth, Knoxville, TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/357,403

(22) Filed: Jul. 20, 1999

Related U.S. Application Data

(60) Provisional application No. 60/070,779, filed on Jan. 8, 1998.

(30) Foreign Application Priority Data

Jan. 8, 1999 (WO) .................................. PCT/US99/00447

(51) Int. Cl.[7] ...................................................... B01J 19/08

(52) U.S. Cl. ....................... 422/186.04; 204/164; 422/22; 588/277

(58) Field of Search ....................... 204/164; 422/186.04, 422/22; 588/277

(56) References Cited

U.S. PATENT DOCUMENTS

| | | |
|---|---|---|
| 4,381,965 | 5/1983 | Maher, Jr. . |
| 4,472,756 | 9/1984 | Masuda . |
| 5,610,097 | 3/1997 | Shimizu . |
| 5,779,991 | 7/1998 | Jenkins . |

FOREIGN PATENT DOCUMENTS

| | | |
|---|---|---|
| 196 05 226 | 8/1997 | (DE) . |
| 0063273 | 10/1982 | (EP) . |
| 588 486 | 3/1994 | (EP) . |
| 2 254 185 | 9/1992 | (GB) . |
| 03 291082 | 9/1991 | (JP) . |
| WO 9638311 | 12/1996 | (WO) . |

OTHER PUBLICATIONS

"Multiple Electrode Plasma Accelerate Incorporate Odd Number Extra Gas Permeable Electrode Main Electrode Alternate Connect Power Source Earth", by Kolchenko A I, Derwent Publications Ltd., Jan. 1987, 87–275756.

*Primary Examiner*—Kishor Mayekar
(74) *Attorney, Agent, or Firm*—Steve Mendelsohn

(57) ABSTRACT

A substrate is configured with first and second sets of electrodes, where the second set of electrodes is positioned asymmetrically between the first set of electrodes. When a RF voltage is applied to the electrodes sufficient to generate a discharge plasma (e.g., a one-atmosphere uniform glow discharge plasma) in the gas adjacent to the substrate, the asymmetry in the electrode configuration results in force being applied to the active species in the plasma and in turn to the neutral background gas. Depending on the relative orientation of the electrodes to the gas, the present invention can be used to accelerate or decelerate the gas. The present invention has many potential applications, including increasing or decreasing aerodynamic drag or turbulence, and controlling the flow of active and/or neutral species for such uses as flow separation, altering heat flow, plasma cleaning, sterilization, deposition, etching, or alteration in wettability, printability, and/or adhesion.

40 Claims, 21 Drawing Sheets

(a) E=3 kV rms, F=3 kHz (b) E=5 kV rms, F=3 kHz (a) Plasma Off (b) Plasma On, E ~ 4.5 kV rms, F = 3 kHz

PARAELECTRIC GAS FLOW ACCELERATOR

CROSS-REFERENCE TO RELATED APPLICATIONS

This application claims the benefit of the filing date of U.S. provisional application no. 60/070,779, filed on 01/08/98 as attorney docket No. 372.6620PROV.

STATEMENT REGARDING FEDERALLY SPONSORED RESEARCH OR DEVELOPMENT

The Government of the United States of America has rights in this invention pursuant to NASA Langley Research Center Cooperative Agreement No. NCC-1-223 awarded by the National Aeronautics and Space Administration.

BACKGROUND OF THE INVENTION

1. Field of the Invention

The present invention relates to plasma generators, and, in particular, to electrohydrodynamic (EHD) flow control of a discharge plasma, such as a one-atmosphere, uniform glow discharge (OAUGD) plasma.

2. Description of the Related Art

The use of magnetohydrodynamics (MHD) to control the turbulent viscous drag due to aerodynamic boundary layer flow has received considerable attention over the years. Most concepts have been based on ionized flow around a magnetized hypersonic vehicle, or on achieving such a plasma with ion seeding techniques. Emphasis has been placed on the magnetohydrodynamic approach in hydrodynamics due to the electrically conducting nature of seawater and perceived high economic or performance payoffs. However, in terms of a net energy balance, performance enhancement has proven elusive.

An alternative to MHD flow control which has received far less attention in the field of boundary layer research is based on the electric field alone, or electrohydrodynamic (EHD) control. In partially ionized gases, the electric field itself, or the paraelectric effects associated with an electric field gradient, can be used to accelerate ions and, via particle collisions (mobility drift), the neutral gas. In the past, a difficulty with the EHD approach, especially in non-hypersonic flight applications, is generating an energy-efficient ionized flow near the surface at one atmosphere.

SUMMARY OF THE INVENTION

Aerodynamic data have been acquired from planar panels with a uniform glow discharge surface plasma at atmospheric pressure. Flat plate panels with either stream-wise or span-wise arrays of flush, closely spaced symmetric or asymmetric plasma-generating surface electrodes were studied with laminar, transitional, and fully turbulent boundary layer flow in a low-speed wind tunnel. The term "stream-wise" refers to orientations in which the flow is parallel to the array of parallel electrodes, while the term "span-wise" refers to orientations in which the flow is perpendicular to the electrodes.

It was observed that EHD forces can produce dramatic effects, which arise from paraelectric, RF forcing of the flow. Notable effects include large increases in measured drag due to either vortex formation (symmetric electrode case) or directed thrust (asymmetric electrode case). In the more dramatic cases, the entire thickness of the boundary layer was affected by either flow acceleration or retardation. The effects of heating are discounted and the primary cause of the observed flow phenomena attributed to electrohydrodynamic (EHD) forcing of the flow by a paraelectric RF body force.

The present invention is directed to a paraelectric gas flow generator that applies a novel approach to electrohydrodynamic flow control of a discharge plasma, such as a one-atmosphere, uniform glow discharge (OAUGD) plasma. An OAUGD plasma is a surface-generated, atmospheric, RF (radio frequency) plasma. One significant feature that distinguishes an OAUGD plasma from other RF plasmas is its efficient ability to create a uniform glow discharge at atmospheric pressure on an extended flat surface. The present invention can be implemented using electrodes having characteristics, such as simplicity, robustness, low cost, and reliability, that lend themselves to practical engineering applications. In order to employ an OAUGD plasma for laminar or turbulent boundary layer control, the present invention generates EHD forces with magnitudes sufficient to alter boundary layer flow dynamics, where such forces constitute a useful flow control mechanism.

In one embodiment, the present invention is directed to an apparatus for generating a flow in gas, comprising (a) a substrate; (a) a first plurality of electrodes configured on the substrate; (b) a second plurality of electrodes configured on the substrate, wherein each electrode in the second plurality is positioned along a first direction between a pair of adjacent electrodes in the first plurality such that said each electrode is closer to one of the pair of the adjacent electrodes that to another of the pair of adjacent electrodes; and (c) a voltage generator configured to the first and second pluralities of electrodes and adapted to apply a voltage to the first and second pluralities of electrodes to generate a discharge plasma in the gas located on at least one side of the substrate adjacent to one of the pluralities of electrodes, whereby the relative positioning of the first and second pluralities of electrodes along the first direction results in a force being imparted onto the gas parallel to the first direction.

In another embodiment, the present invention is a method for generating a flow in gas, comprising the steps of (a) providing a substrate configured with first and second pluralities electrodes, wherein each electrode in the second plurality is positioned along a first direction between a pair of adjacent electrodes in the first plurality such that said each electrode is closer to one of the pair of the adjacent electrodes that to another of the pair of adjacent electrodes; and (b) applying a voltage to the first and second pluralities of electrodes to generate a discharge plasma in the gas located on at least one side of the substrate adjacent to one of the pluralities of electrodes, whereby the relative positioning of the first and second pluralities of electrodes along the first direction results in a force being imparted onto the gas parallel to the first direction.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Introduction

Figure 1:
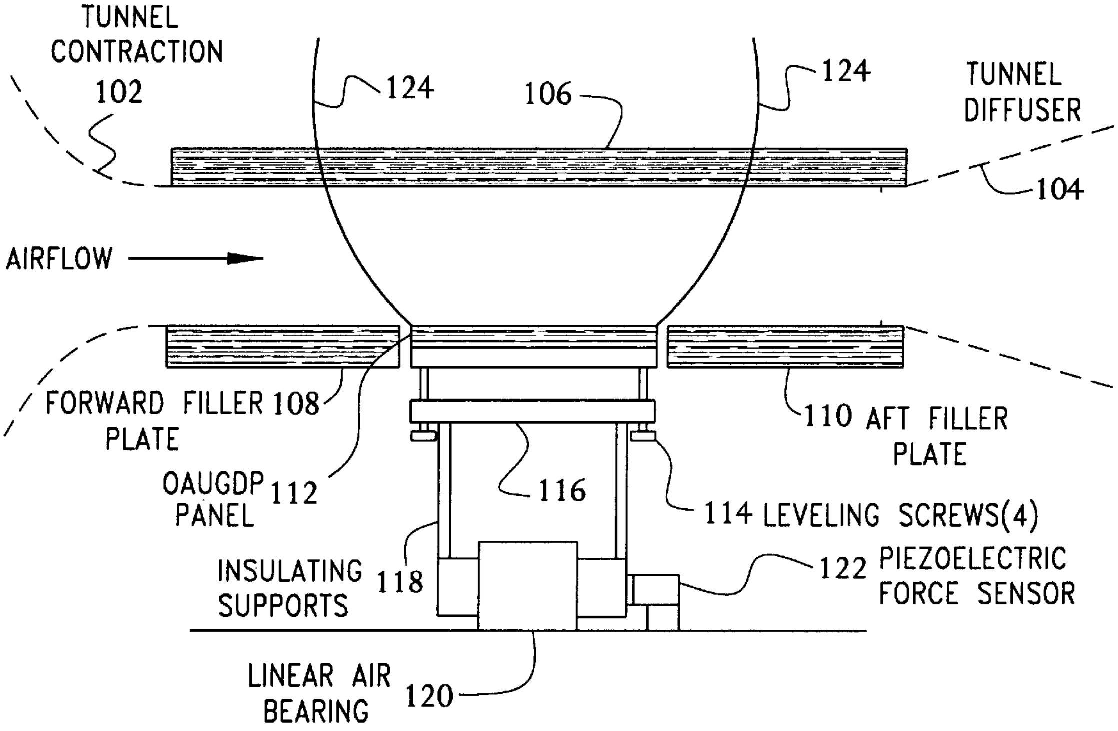
FIG. 1 shows a cross-sectional schematic view of the test section of a 7×11 wind tunnel used to test the present invention.

Low-speed wind tunnel data have been acquired for planar panels covered by a uniform, glow-discharge surface plasma in atmospheric pressure air known as the one-atmosphere, uniform glow discharge (OAUGD) plasma. Stream-wise and span-wise arrays of flush, plasma-generating surface electrodes have been studied in laminar, transitional, and fully turbulent boundary layer flow. Plasma between symmetric stream-wise electrode strips caused large increases in panel drag, whereas asymmetric span-wise electrode configurations produced a significant thrust. Smoke-wire flow visualization and mean velocity diagnostics show the primary cause of the phenomena to be a combination of mass transport and vertical structures induced by strong paraelectric electrohydrodynamic (EHD) body forces on the flow.

Before introducing the OAUGD plasma and the EHD flow control of the present invention, however, some additional discussion of pure EHD controls will help to show why this approach has been chosen. One feature of EHD controls is that the electrostatic force on a charged particle can be significantly larger than the magnetic force on the same moving charge for practicable engineering values of magnetic and electric field strengths. This is an important point in view of potential aerospace flight applications. The maximum practical magnetic field (B) from permanent magnets that can be expected in flush-mounted, non-obstructive surface application is estimated to be no more that about 0.1 Tesla. While higher values are obtainable with electromagnets, their Joulean dissipation (or superconducting refrigeration energy requirements) would seriously compromise any net energy saving in, for instance, a drag reduction application. The minimum electric field (E) required to generate an OAUGD plasma in air is about 10 kV/cm. Assuming a typical commercial transport flight velocity (U) of 300 m/sec, the force ratio on a singly charged particle is given by the quotient $E/UB=3.3\times10^4$. In other words, the electric force on such a charged particle is more than four orders of magnitude greater than the maximum practicable magnetic force.

To examine the ratio of body forces, the magnitude of the electrical current and charged particle number densities must be considered as well. For an OAUGD plasma, a charged particle number density ($N_e$) of $1.0\times10^{17}/m^3$ is characteristic. A maximum current density (J) of $10^4$ $A/m^2$ corresponding to th glow-to-arc transition is assumed as a value not likely to be exceeded in any glow discharge plasma application. The body force ratio is then given by the quotient $r_B=qN_eE/JB$, where q is the electronic charge. This yields $r_B=16$, or an EHD body force more than one order of magnitude greater than that of the MHD body force.

Another fundamental advantage of EHD forces is that the electric field can do work on the charged particles and, through strong collisional coupling at one atmosphere, on the aerodynamic flow itself. A static magnetic field of force always operates orthogonally to the charged particle velocities, and therefore can do no work on the particles or the flow. For aerodynamic flow control applications, EHD is the preferred approach. The questions are how to effectively produce the requisite electrically charged medium at one atmosphere, and how to configure and drive the electric fields to produce effects that may be useful in such areas as drag reduction, heat transfer, lift, or flow separation.

An adequate number density of charged particles can be produced in an OAUGD discharge. An OAUGD plasma is an extremely uniform, low-frequency RF glow discharge that does not require either a vacuum environment or the mega- or giga-hertz supply frequencies typical of industrial RF plasmas. The OAUGD plasma operates on the principle of the charge-trapping mechanism. Charge trapping refers to a specific, constrained, periodic oscillation of ions and/or electrons along electric field lines between a pair of (typically flat) electrodes that are characteristically side-by-side in flat-panel aerodynamic applications. This electrostatic trapping may reduce plasma polarization, keep ions from knocking secondary electrons off the instantaneous cathode (which may initiate avalanches or breakdown), and prevent ions from heating the cathode surface and initiating a glow-to-arc transition.

Based on straightforward Lorentzian electrodynamic analysis of the plasma, the charge trapping mechanism identifies the pertinent independent variables, which include the electric field strength (E), electrode separation distance (d), type of gas, pressure (p), and RF electric field frequency ($v_0$). A relation among these variables is given by Equation (1) as follows:

$$\nu_0\ E/(pd) \qquad (1)$$

for the case of a parallel-plate geometry. A planar-strip geometry will have a similar but more complicated relation due to the arched field lines, but the same qualitative functional dependencies would be expected to prevail. The electric field E in Equation (1) may be approximated by the electrode potential (V), with E=V/d. Provided the operating parameters are in accordance with Equation (1), the OAUGD plasma will function at one atmosphere and produce a stable, steady-state glow discharge. A plasma thickness of one or two millimeters at power densities well below one watt per cubic centimeter is typical for experiments related to the present invention.

Equation (1) does not represent a finely tuned phenomenon and the parameters can vary over a useful range while maintaining the existence and uniformity of the plasma. If any of the parameters deviate significantly from Equation (1), however, either the OAUGD plasma will cease to function, or its uniformity will degrade into a filamentary discharge.

The magnitudes of the parameters in Equation (1) for bench-top demonstration of the OAUGD plasma are easily attainable. For instance, a frequency of several kilohertz, an rms voltage of several kilovolts, and a planar strip separation distance of 5 or 10 mm are adequate to initiate the plasma at atmospheric pressure. The OAUGD plasma is not hard-starting, and does not require external initiation with a Tesla coil or spark gap. While the dissipative (or plasma) current in the OAUGD plasma is small (about 0.030 amp rms in these experiments), without special impedance matching, the reactive, non-dissipative current can be large (approximately 0.4 amp rms) and the power source should be sized accordingly.

The absence of any large dissipative currents due to filamentary breakdown or arcing in the OAUGD plasma allows it to operate at low power levels, consistent with the possibility of net energy savings in flight boundary layer flow control or drag reduction applications. For example, a characteristic boundary layer viscous dissipation value for a long-range commercial transport has been estimated to be roughly 5000 watts per square meter (Boeing 737-class airplane at cruise conditions). By comparison, in bench-top tests, the OAUGD plasma can operate with a power of 320 $W/m^2$ or less based on the measured, non-reactive power and the surface area covered by the plasma. While such a low power level might not be able to effectively control a turbulent boundary flow at relatively high Reynolds number flight conditions, the energy cost of sustaining a uniform layer of glow discharge plasma over a large area is nonetheless very low.

This low energy cost occurs for a fundamental reason: the OAUGD plasma is a glow discharge, created twice during each RF cycle. As a glow discharge, the ionization process in the instantaneous cathode region occurs at the Stoletow point, which is about 81 electron-volts (eV) per ion-electron pair for air. This is, in principle, the lowest possible energy cost of producing an ion-electron pair in a plasma source, and compares very favorably with the energy cost of other atmospheric plasma sources, such as plasma torches or arc-jets, for which the energy cost is about 10,000 eV/ion-electron pair.

Regarding applications, the OAUGD plasma is quenched by liquid water, although it recovers rapidly from a water spray. As such, it can be used for applications in the usual ranges of atmospheric, climatic humidity conditions, and is especially applicable to dry, high-altitude applications.

The OAUGD plasma is fundamentally different from ion wind concepts that rely on a corona discharge as an ion source. Malik, M. R., Weinstein, L. M., and Hussani, M. Y., "Ion Wind Drag Reduction," AIAA Paper 83-0231 (1983), describes the use of the ion wind technique in a flat-plate DC "brush" discharge fashion to secure a small reduction in measured drag of about 5% for a turbulent boundary layer flow at a length Reynolds number of approximately one million. This research was later abandoned, however, due to inability to scale the operation of the hardware to flight conditions. More recently, El-Khabiry and Colver were able to produce up to 50% or more viscous drag reduction in very low Reynolds number flows (on the order of 100,000) using a corona discharge between span-wise wires on a flat surface for both DC and low-frequency (60 Hz) AC excitation. See El-Khabiry, S. and Colver, G. M., "Drag Reduction by DC Corona Discharge Along an Electrically Conductive Flat Plate for Small Reynolds Number Flow," Phys. Fluids, Vol. 9, No. 3 (1997), pp.587–599. Each of these techniques is probably limited to low Reynolds number applications due to limitations on scaling the corona discharge effect to higher flow velocities. The OAUGD plasma, however, is more readily scalable and has the potential to function at much higher Reynolds numbers.

With an efficient source of surface plasma, the challenge becomes how to effect a useful EHD flow control mechanism in a boundary layer, particularly a turbulent boundary layer. Initial investigations were aimed at understanding the basic response of a boundary layer to several simple, planar electrode configurations that can be used to produce the OAUGD plasma. These consist of stream-wise and span-wise arrays of flush-mounted strip electrodes on a flat panel, all at the same RF potential and phase with respect to a ground plane or electrode on the opposite side of the panel.

Experimental Apparatus

Low-speed wind tunnel tests of panels with the OAUGD plasma were conducted in the NASA Langley 7×11 Inch Low Speed Wind Tunnel to determine the basic response of boundary layer flow to the plasma for a few simple panel configurations. The 7×11 wind tunnel is a closed return, unpressurized air facility with a test section 178H×279W×914L millimeters. A 305×279 millimeter central portio of the lower test section wall was used for testing. Tests included the directly measured viscous drag of flat plate panels with the OAUGD plasma generated on the surface, vertical (wall-normal) boundary layer pitot pressure profiles measured a short distance downstream of the panels, and smoke flow visualization tests.

FIG. 1 shows a cross-sectional schematic view of the test section of the 7×11 wind tunnel, with its air-bearing drag balance. As shown in FIG. 1, the test section is located between the tunnel contraction 102 and the tunnel diffuser 104 with airflow from left to right. The test section is defined between an upper plate 106 ,on the top, and forward and aft filler plates 108 and 110 separated by the OAUGD plasma panel 112, on the bottom. Plasma plate 112 is supported by four leveling screws 114 connected to a support plate 116, which is in turn supported by four insulating supports 118 connected to a linear air bearing 120 that is controlled by a piezoelectric force sensor 122 to maintain the desired equilibrium position of the plasma panel 112.

Semi-catenaries 124 were used as high-voltage power leads to the plasma panel 112. They consist of brass-ball utility chains (commonly used for light switch pull chains, etc.) and were chosen for their extreme flexibility, electrical conductivity, and lack of any sharp, corona-producing features. By exerting equal and opposite horizontal forces on the drag balance, the forces due to the power leads approximately cancel out. Any small remaining residual force is well within the linear range of the instrument and is accounted for in the no-flow drag tare readings.

The smoke wire (not shown) was 0.1-mm diameter type 304 stainless steel and was stretched across the width of the test section at a variable height above the wall. A weight and pulley arrangement kept the wire taut during heating. It was powered by a variable DC power supply with a 100 vdc maximum output (typical range at 4 m/s was 40–50 vdc). The "smoke" was the vapor of common mineral oil. Smoke wire photographs were obtained by firing an electronic flash during the vertical blanking period of a full frame, monochromatic digital video camera (8-bit resolution, 768 by 484 pixels), at a variable delay time after energizing the smoke wire. The delay time was determined by trial and error. Video pixel data were downloaded from the digital camera to a computer for processing.

For velocity profiles, a slender, tapered total pressure pitot tube was traversed across the boundary layer height downstream of the energized plasma panels. The tip was fabricated from flattened, stainless-steel hypodermic tubing. The tip height was 0.28 mm and the width was 0.65 mm. The probe was far enough downstream of the energized panel to prevent any electrical arcing to the instrument. The initial height of the probe above the wall was set by monitoring electrical contact between the probe and metallic wall. The probe was raised through the boundary layer with an automated stepping motor-driven slide mechanism in 0.5-mm increments. A typical profile was acquired quickly (in about 30 seconds) to prevent heating the panels, which could cause their adhesive backing to weaken and release. Pitot differential pressure was measured between the probe and a static pressure port of the tunnel wall with a high-accuracy capacitive or piezoelectric gauge.

Figure 2:
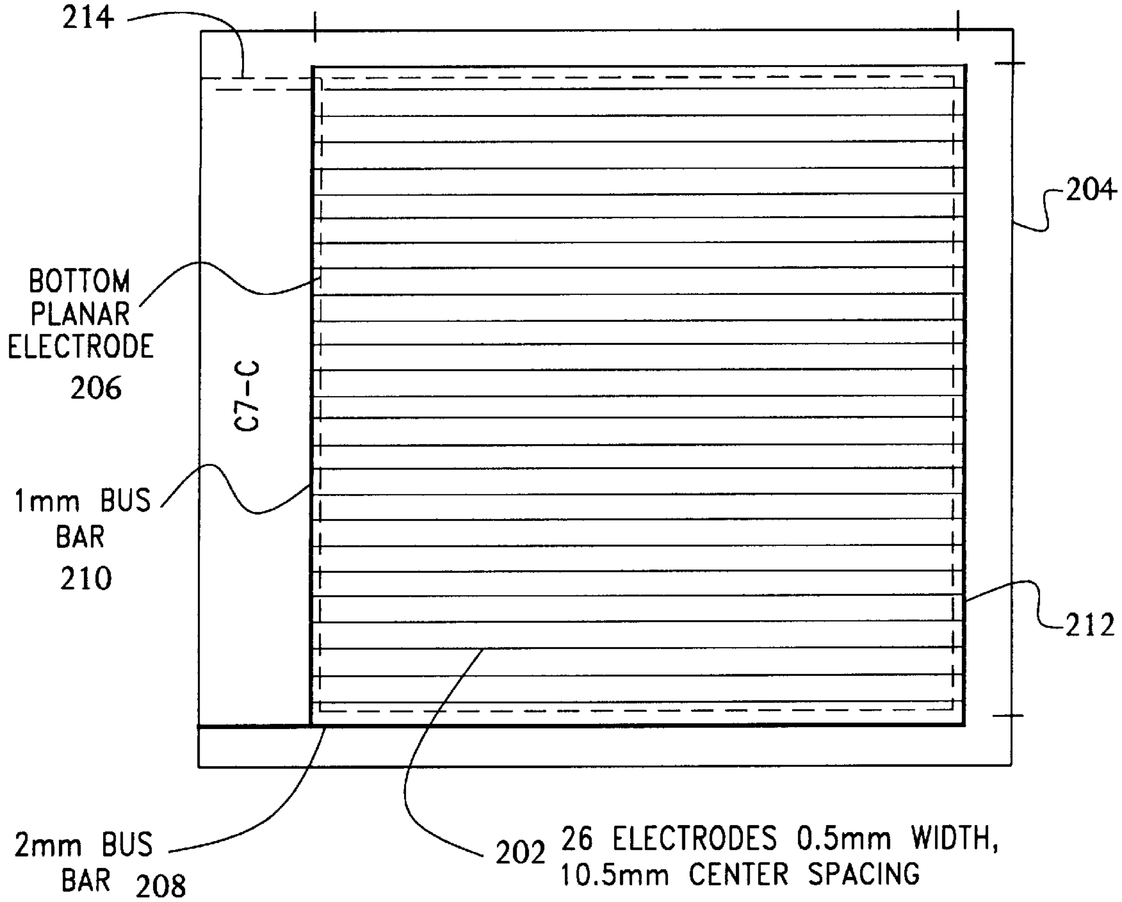
FIG. 2 shows a plan view of the plasma panel of FIG. 1, according to one embodiment of the present invention.

FIG. 2 shows a plan view of OAUGD plasma panel 112 of FIG. 1, according to one embodiment of the present invention. Panel 112 is constructed from conventional dielectric printed circuit board material (woven-glass/epoxy construction, 0.75 mm thick, double-sided, 1-ounce copper coating).

Figure 3A:
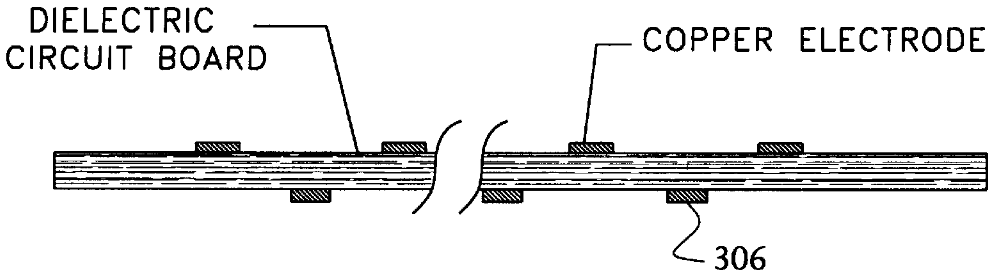
FIGS. 3*a–c* shows cross-sectional views of three different embodiments of the plasma panel of FIG. 2.
Figure 3B:
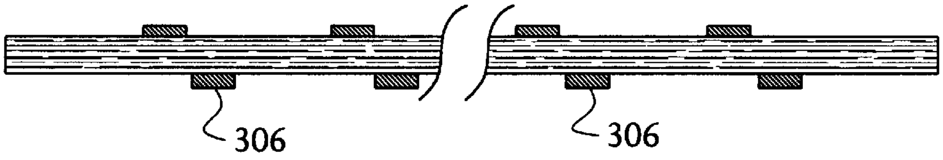
Figure 3C:
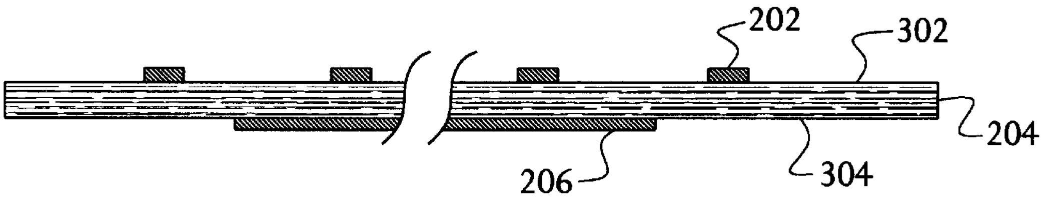

FIG. 3*c* shows a cross-sectional view of panel 112 of FIG. 2. Panel 112 has an array of 26 parallel electrode strips 202, 0.5 mm wide and 10 mm apart, etched on the top (flow) side 302 of circuit board 204, and a single planar electrode 206 (e.g., a uniform copper plane) on the bottom side 304 of circuit board 204. As shown in FIG. 2, electrical power is provided to electrode strips 202 via bus bars 208, 210, and 212, and to planar electrode 206 via bus bar 214. The plasma-generating electric field lines arch over the upper surface of the board (where the plasma is generated) and traverse the board thickness.

FIGS. 3*a*–*b* show cross-sectional views of OAUGD plasma panels, according to alternative embodiments of the present invention, in which the bottom side of the circuit board has an array of electrode strips 306 instead of a single planar electrode. FIG. 3*a* shows a symmetric configuration in which the electrode strips on the bottom side are located midway between the electrode strips on the top side. Note that the configuration shown in FIG. 3*c* is also a type of symmetric configuration, with the single lower planar electrode 206 located at the center of the array of electrode strips 202 on the top side. FIG. 3*b* shows an asymmetric configuration in which the electrode strips on the bottom side are offset from the midway position between the electrode strips on the top side. The asymmetric configuration is useful in accelerating or decelerating the boundary layer flow.

For all tests, the flow passed over the copper electrodes with no additional dielectric coating. Since the OAUGD plasma charge-trapping mechanism operates on displacement rather than real electrical currents, this surface can, if desired, be covered with a thin insulating and/or protective layer without qualitatively affecting the results reported herein. The circuit board was attached to a 12.7-mm thick fiberglass backing board (type G-10) with double-sided adhesive tape to make the panel structurally rigid but still capable of being disassembled. The designation code and electrode dimensions of the various panels reported on in this paper are listed in Table I. The electrode pitch refers to the center-to-center spacing of electrodes. For example, for 0.5-mm wide strips separated by 10 mm, the electrode pitch is 10.5 mm.

TABLE I

Panel Designations and Electrode Dimensions

| Panel # | Orientation | Configuration | Electrode Width | Electrode Pitch |
|---|---|---|---|---|
| C7-C | Span-wise | FIG. 3c | 0.5 mm | 10.5 mm |
| C7-A | Stream-wise | FIG. 3c | 0.5 mm | 10.5 mm |
| C1-B | Stream-wise | FIG. 3a | 2.0 mm | 8.0 mm |
| E6-C | Span-wise | FIG. 3b | 0.5 mm | 8.5 mm |
| C1-C | Span-wise | FIG. 3a | 2.0 mm | 8.0 mm |

The parallel electrode strips on the top of the panel were bussed together and connected to one power supply terminal and the lower plane or electrodes underneath the panel to the other terminal. The parallel electrode strips on top of the panel were generally at high voltage, while the lower electrode was grounded, although configurations with the opposite polarity would also produce plasma and the effects reported below. A high-voltage (up to 5.4 kV), low-frequency RF (up to 20 kHz) power supply was used with its transformer output connected directly to the panel without a special impedance matching network.

Figure 4:
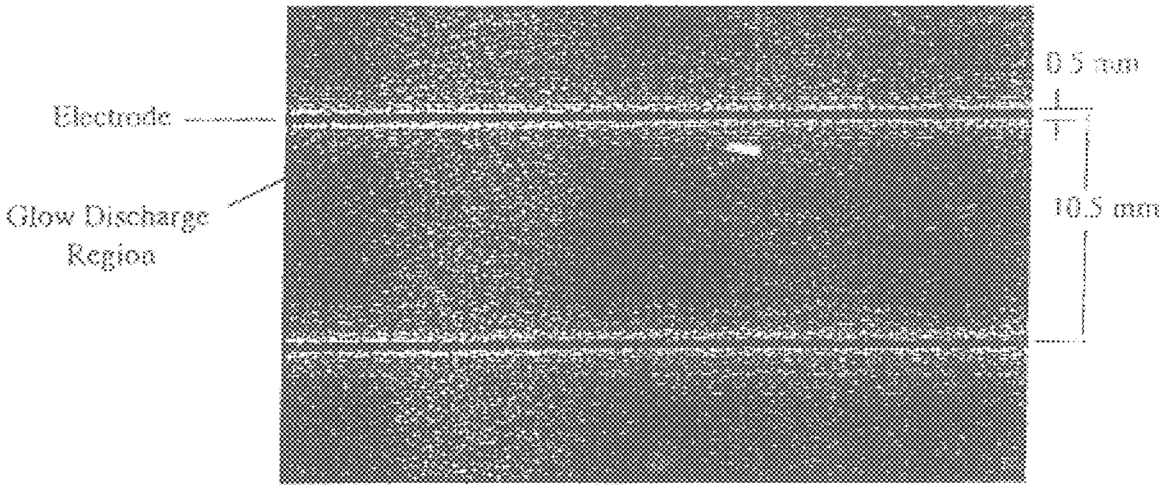
FIG. 4 is a plan view of an energized plasma panel of the present invention.

FIG. 4 is a plan view of a panel energized (plasma activated with an electrode voltage of about 3 kV rms and frequency of about 3 kHz, but with no flow) and is representative of the technique. The two 0.5-mm solid, horizontal, dark strips are parallel copper electrode strips. The gray-scale regions to either side of the electrodes are the OAUGD plasma. The plasma was visually extremely uniform.

For drag tests, the panel was mounted on an air bearing drag balance located below the tunnel test section, with the panel forming the central section of the lower wall. The boundary layer flow was tripped near the outlet of the tunnel's contraction with a 1.07-mm circular rod on the test wall 575 mm upstream of the leading edge of the panel. Small (0.25-mm) gaps around the test panels (e.g., between plasma panel 112 and filler plates 108 and 110 in FIG. 1) allowed them to float freely on the drag balance. A pressure control box around the test section allowed the static pressure in the test section to be matched to the control box pressure. This minimized errors in drag measurements by reducing flow in the gaps surrounding the panels.

Procedures and Results

Data for stream-wise and span-wise electrode orientations were acquired, as well as paired comparison drag data for both the plasma-energized and unenergized (approximate smooth flat plate drag) conditions. Data were also taken on panels with asymmetric arrays of electrodes such as those shown in FIG. 3*b* to study the acceleration and deceleration of the flow in the boundary layer, and the consequent drag decrease or increase (respectively) compared to the unenergized flat plate. Data on drag increase or decrease were measured as parametric functions of the flow velocity (up to 26 m/s), electrode voltage (up to 5.4 kV rms), and RF frequency (from 500 to 8000 Hz).

The direction and magnitude of the paraelectric plasma-induced acceleration of the flow is determined by the direction of the electric field gradients, and these are in turn strongly influenced by the orientation and details of the electrode geometry. The data reported here are for unoptimized electrode geometries. It is anticipated that with additional modeling studies, geometrical optimization will increase the magnitude of the effects reported at a given set of plasma operating parameters. In addition, the electrodes in this study were energized with a single phase of RF excitation. This produces EHD body forces which are the result of averaging attractive and repulsive forces over the RF cycle, a second-order effect. Much stronger effects should be possible when adjacent electrodes are excited with polyphase RF power, providing a DC electric field parallel to the surface, a first-order EHD effect.

In this patent application, data are presented for three principal cases: (a) laminar data for which the wind tunnel flow was laminar before encountering the panel; (b) transitional data corresponding to about 75% intermittency at the upstream edge of the model; and (c) fully turbulent data. Since the boundary layer flow was tripped upstream of the panel, there was actually no case of completely undisturbed laminar flow. At low tunnel velocities, however, the flow was laminar (but with occasional unsteady oscillations) as evidenced by smoke-wire path-line visualization and the absence of any turbulent breakdown in diagnostic hot-wire signals.

Figure 5A:
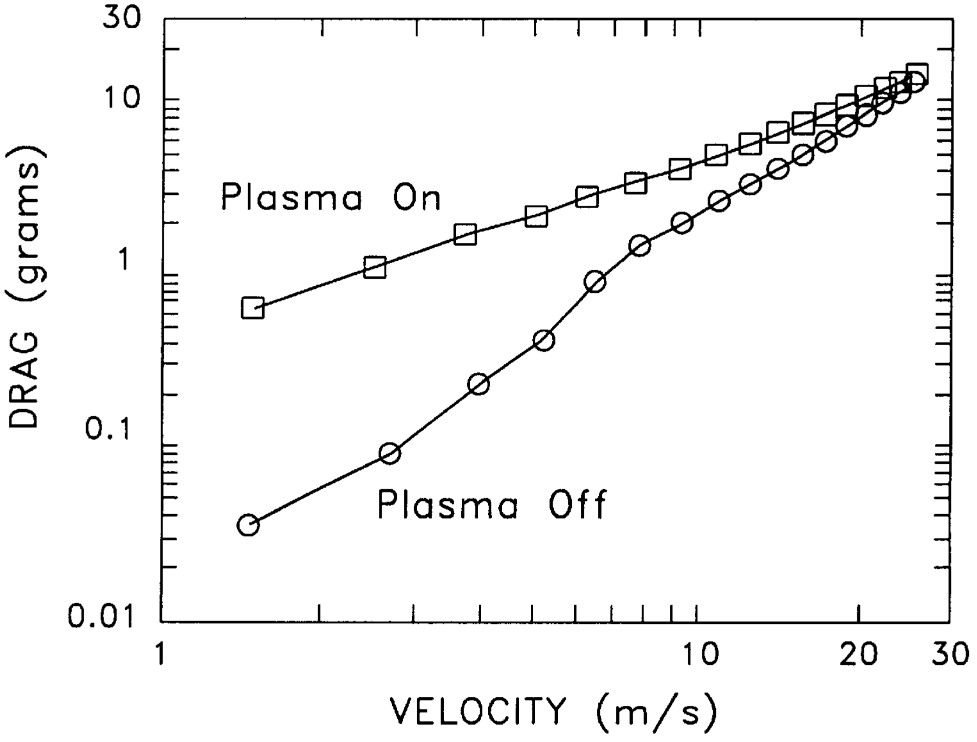
FIGS. 5*a–b* show drag vs. velocity results from plasma panels with symmetric electrodes, for the stream-wise and span-wise electrode orientations, respectively.
Figure 5B:
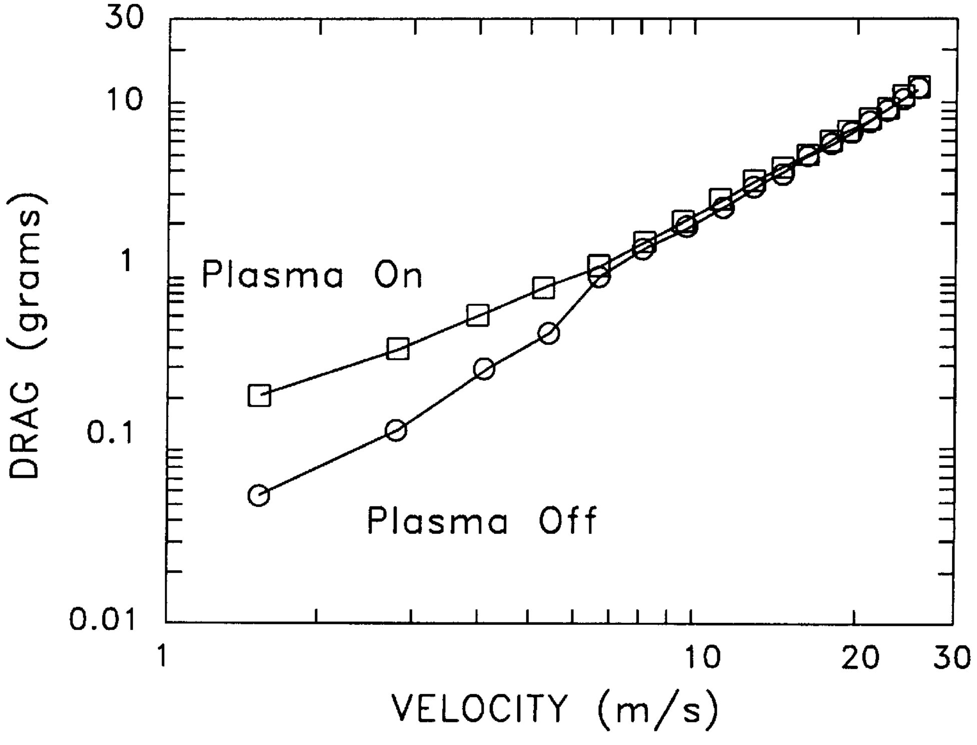

Representative results from a panel with symmetric electrodes, each electrode a copper strip 0.5 mm wide with centers spaced 10.5 mm apart, are shown in FIG. 5*a* for the stream-wise electrode orientation (Panel C7-A), and in FIG. 5*b* for the span-wise electrode orientation (Panel C7-C). Each of these shows the expected power-law Reynolds number dependence for the "plasma off" condition. Note the change in slope of the "plasma off" curve in FIG. 5*a* or 5*b* in the range of 7–8 m/s, corresponding to transition from laminar to turbulent flow. For the "plasma on" stream-wise electrode case of FIG. 5*a* (with an electrode voltage of about 4 kV rms and frequency of about 3 kHz), a substantial increase in drag is observed. This is due to several factors. As will be shown, the plasma excitation for velocities below about 7 m/s (laminar region) trips the flow to full turbulence, partially explaining the drag increase in that region. The drag increase persists, however, to the highest attainable velocity of the wind tunnel indicating that more than just flow tripping is involved. For the "plasma on" span-wise electrode case of FIG. 5*b* (with an electrode voltage of about 4 kV rms and frequency of about 3 kHz), a smaller drag increase is produced and only in the laminar/transitional region. The difference in behavior between the two cases along with evidence presented later in this specification suggests the formation of strong, EHD-driven, stream-wise vertical structures in the boundary layer for the stream-wise-oriented electrode case of FIG. 5*a*.

The very small differences in surface configuration among different panels did not measurably affect (beyond the intrinsic precision of the data) the drag for the unenergized panels reported in this specification. Despite the small roughness introduced by the copper electrodes on the panel surfaces, relative to the energized cases, the unenergized models behaved as smooth flat plates.

Figure 6A:
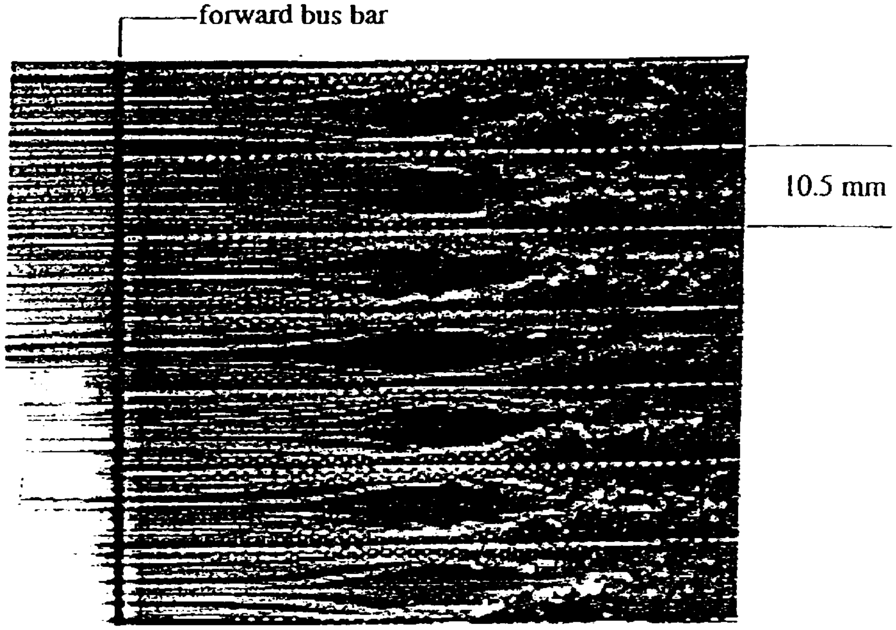
FIGS. 6*a–c* show smoke-wire flow visualizations for different excitation voltages and/or different plasma panels.
Figure 6B:
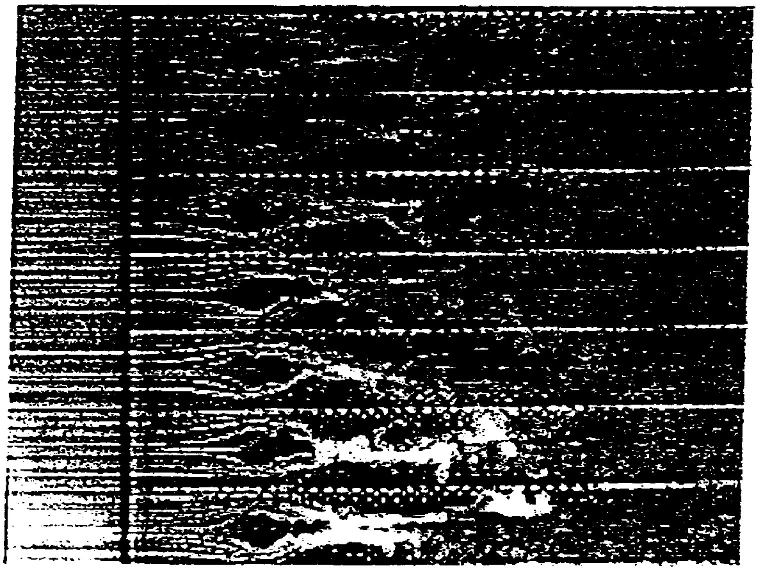

It was observed that when the panels with electrode orientations parallel to the flow were energized, the presence of the OAUGD plasma was a strong promoter of full boundary layer turbulence. If the flow was laminar at the panel leading edge, energizing the plasma for either the span-wise or stream-wise electrode case would trip the flow. This is illustrated in FIGS. 6*a* and 6*b*, smoke-wire visualizations at a height of 5 mm of the flow over Panel C7-A (the stream-wise electrode counterpart of Panel C7-C shown in FIGS. 2 and 4). FIG. 6*a* shows the smoke-wire path-lines for a stream velocity (U) of 4 m/s at a height of 5 mm above the surface (u/U ~0.65). The panel is energized at about 3 kHz and about 3 kV rms. The convergence of the smoke path-lines toward the electrodes, the apparent subsequent formation of vertical structures, and the breakdown into turbulence are all clearly evident. FIG. 6*b* shows the same conditions as FIG. 6*a*, but at a higher electrode voltage of 5 kV rms. Because of the higher electric field at this voltage, the vortical structures develop sooner, are more compact, and break down sooner. The presence of the plasma generated by the symmetric electrode configuration constitutes a very strong tripping mechanism.

Figure 6C:
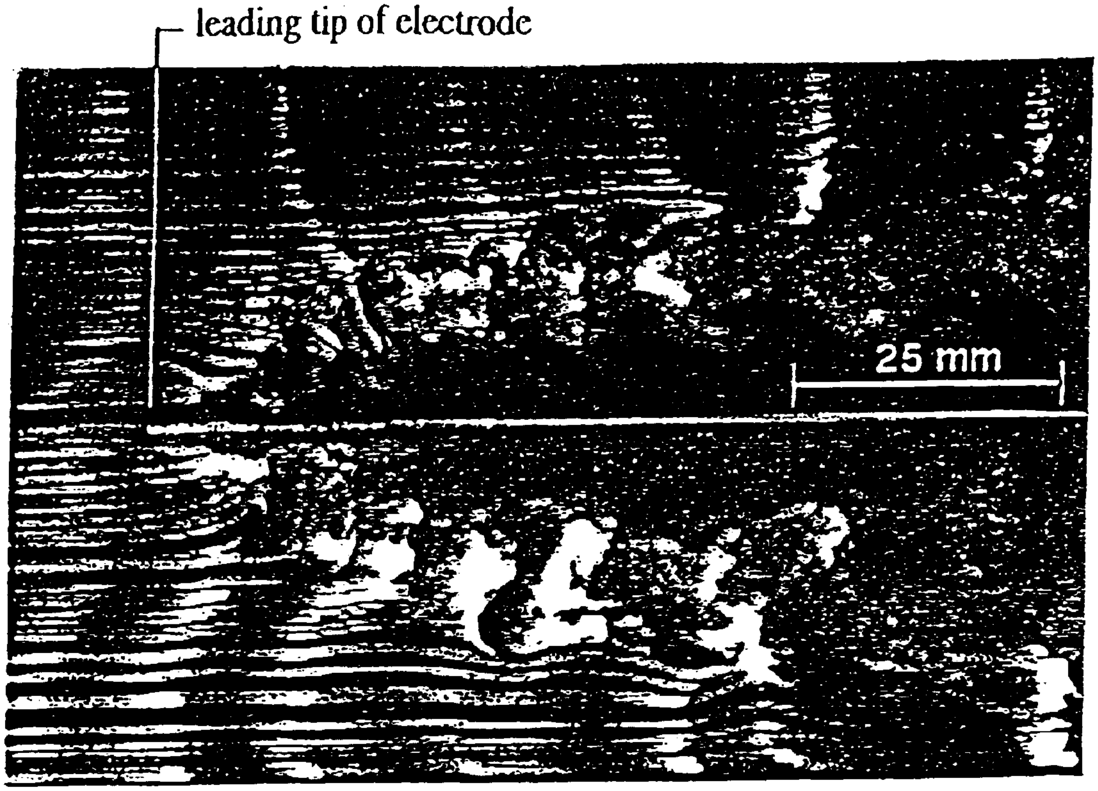

FIG. 6*c* shows the smoke path-lines for the case of a single, isolated stream-wise electrode above a planar lower electrode. The electrode strip is 0.5 mm wide. The velocity is 4 m/s and the wire height in this case is 2 mm. Near the leading tip of the electrode, the smoke path-lines appear initially to symmetrically converge towards the electrode, forming counter-rotating vortical structures which quickly become turbulent. This process occurs along the length of the electrode, giving rise to the spreading effect observed. FIG. 6*c* is further evidence of strong EHD forces in play. (Also observed in FIG. 6*c* are quasi-two-dimensional wave crests upstream and to the sides of the vortical structures. These waves were also present without the plasma, and are presumed to be laminar instability waves (TS waves) associated with other flow disturbances, e.g., the disturbances input by the boundary layer trip upstream of the test section or even the smoke wire itself. They have no significant relation to the EHD forcing or stream-wise vortical structure formation.) For each of the early plasma panels, it was observed that a small electrostatic drag (by comparison with the viscous drag usually measured) was observed, which is unrelated to the flow. This drag is induced by electric field lines terminating on the panels with or without a plasma present, and is present even in the absence of a flow. This electrostatic drag arises from the electrodynamic stress tensor, in which the electric field lines can be visualized as acting in tension between the panel electrodes and the grounded surroundings, producing an electrostatic pressure and an rms average force on the panel. The measured drag should be (and was) corrected for this electrostatic, non-flow-related drag. The electrostatic drag (or electrostatic pressure) follows a quadratic relationship between the applied rms excitation voltage and measured drag.

Figure 7:
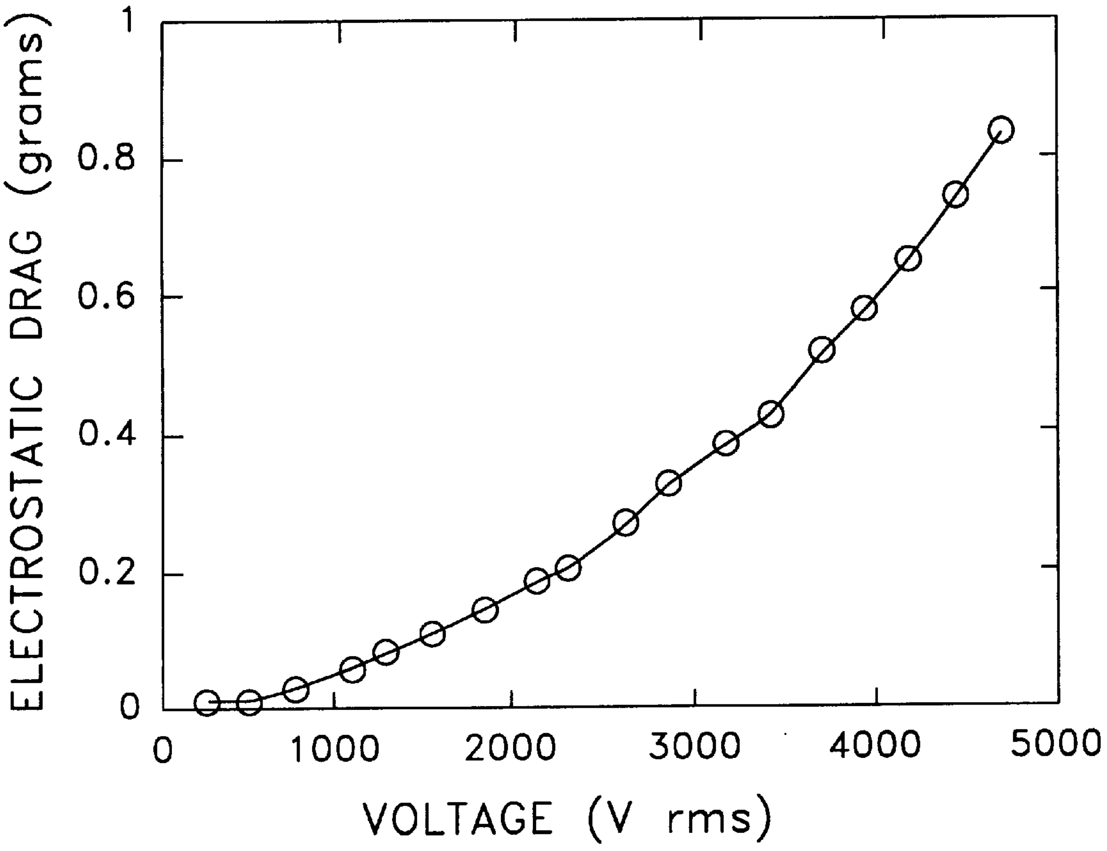
FIG. 7 is shows the electrostatic drag force vs. voltage for a plasma panel.

FIG. 7 is a representative plot of the electrostatic drag force for Panel C1-B as a function of electrode voltage for a frequency of 1.5 kHz and U =0. By replacing metallic with non-metallic surfaces near the panel and drag balance, the magnitude of the electrostatic drag shown in FIG. 7 was reduced to insignificant levels in the more recent data. All drag data presented in this specification were corrected for electrostatic drag when it was above the resolution of drag measurements (about 10 milligrams).

Figure 8A:
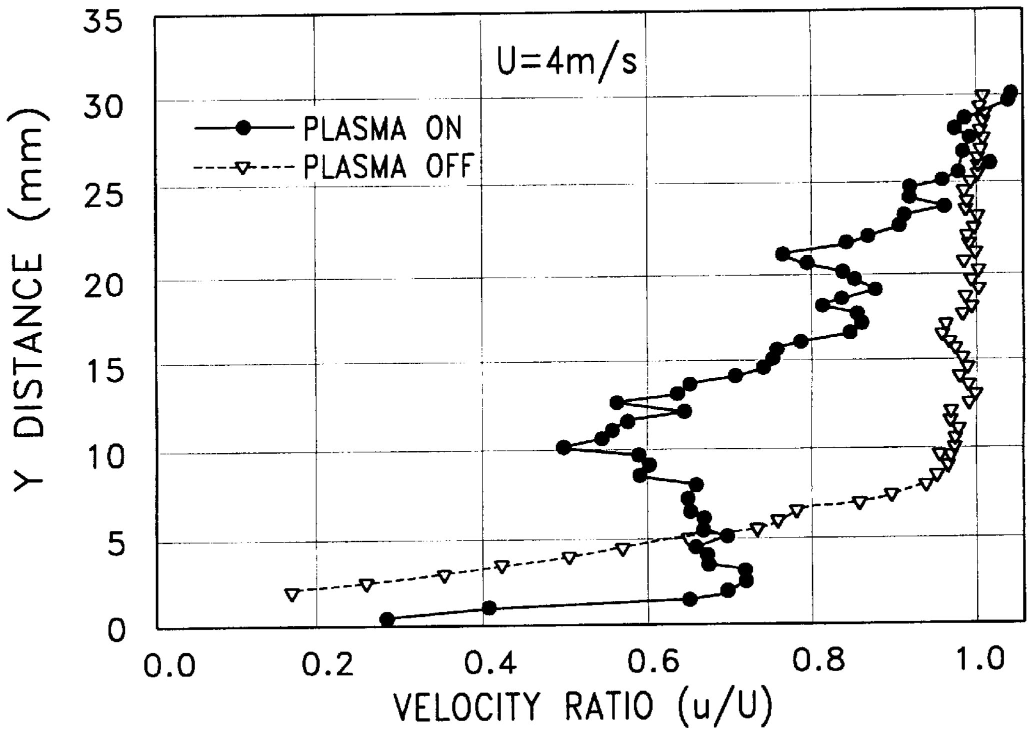
FIGS. 8*a–c* show wall-normal velocity profiles for a plasma panel with symmetric, stream-wise electrodes, for the case of laminar, transitional, and fully turbulent flow, respectively.
Figure 8B:
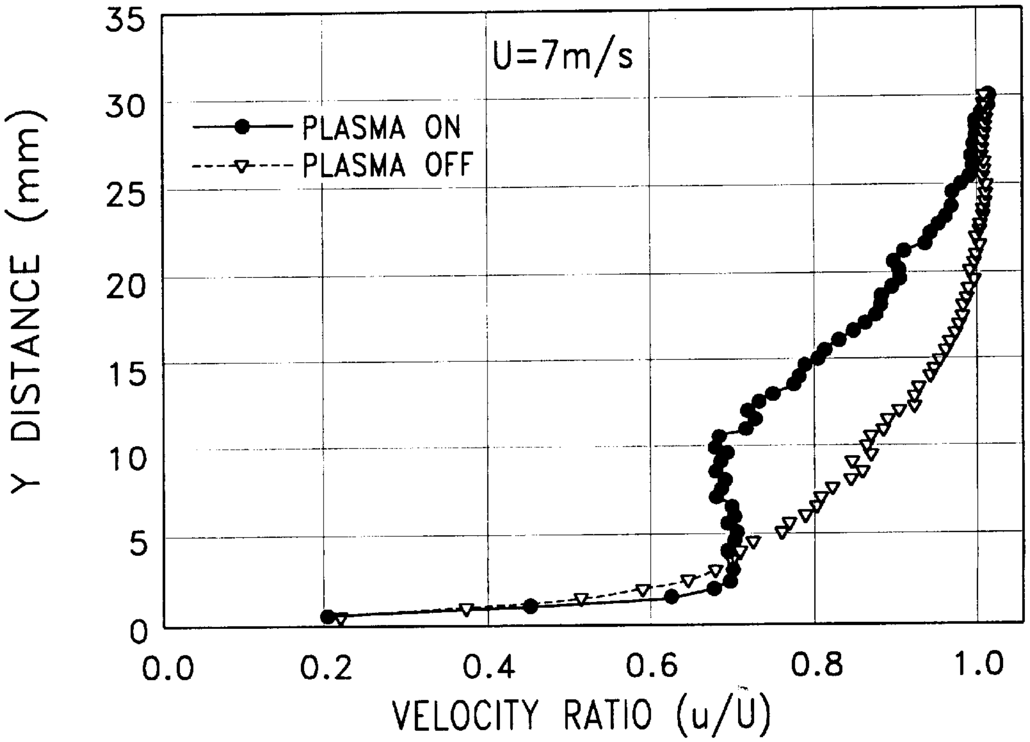
Figure 8C:
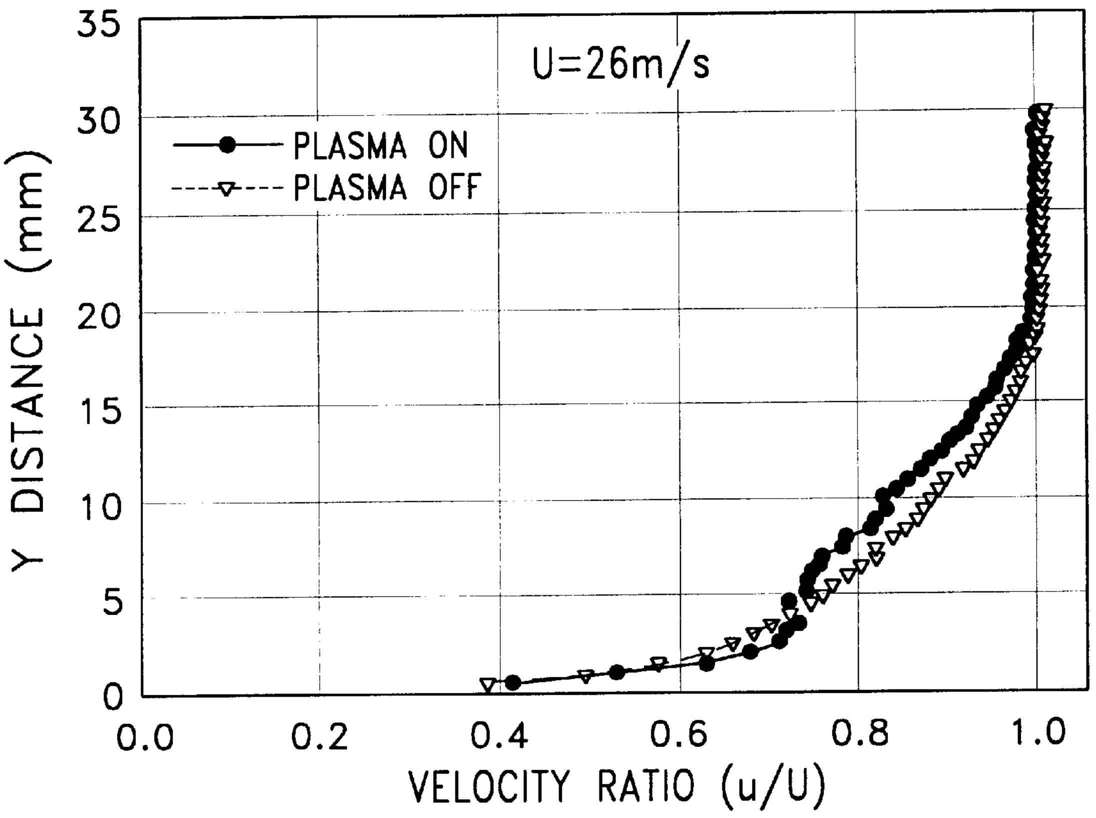
Figure 9A:
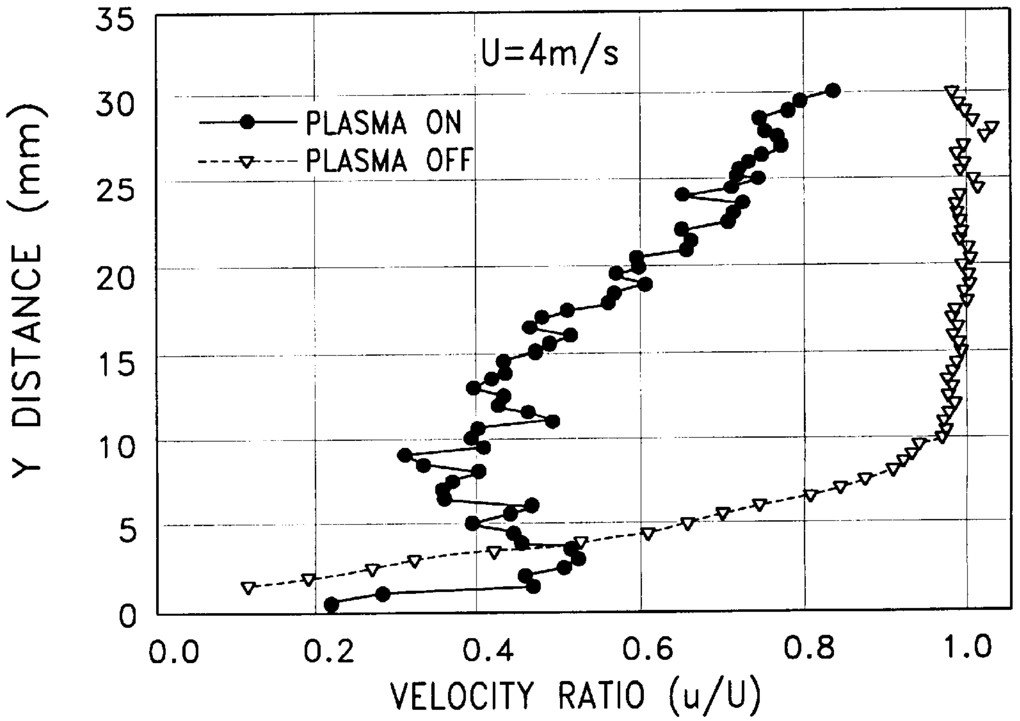
FIGS. 9*a–c* show wall-normal velocity profiles for the stream-wise electrode configuration, with the pitot probe directly behind one of the stream-wise electrodes.
Figure 9B:
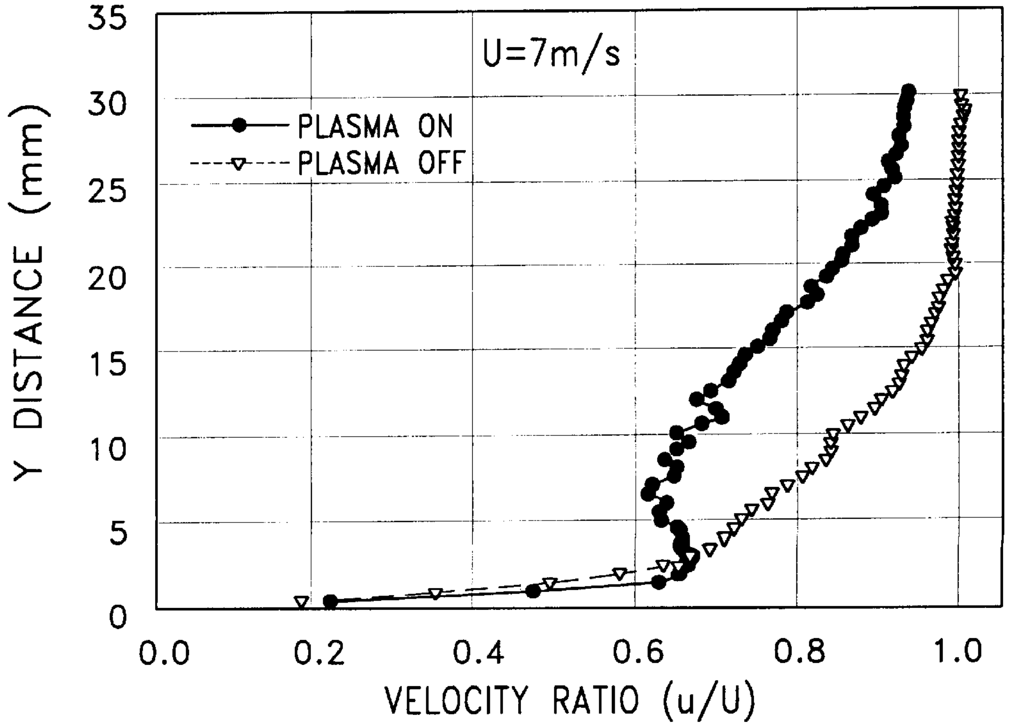
Figure 9C:
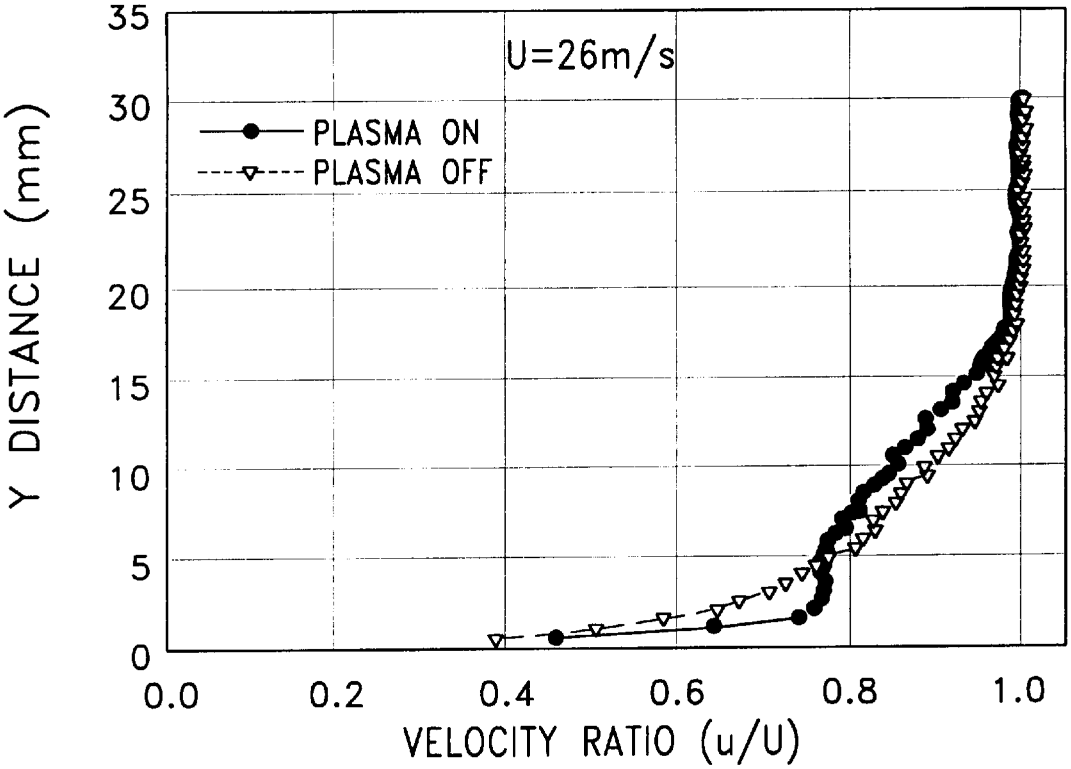
Figure 10A:
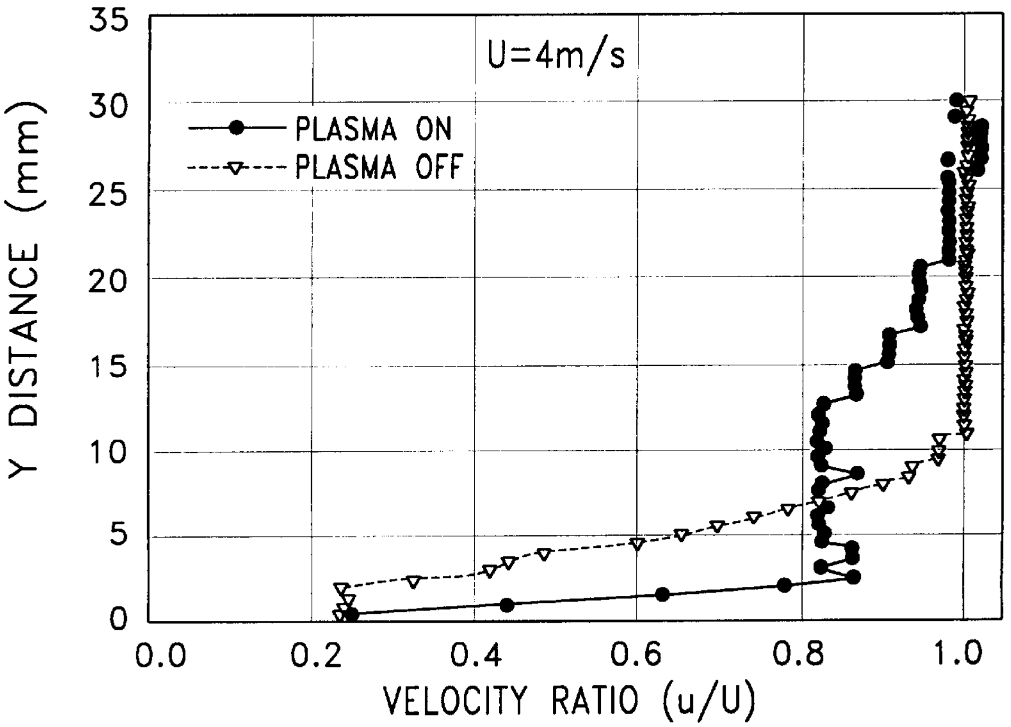
FIGS. 10*a–c* show wall-normal velocity profiles downstream of span-wise oriented electrodes on a plasma panel with the pitot tube located 28 mm downstream of the last electrode.
Figure 10B:
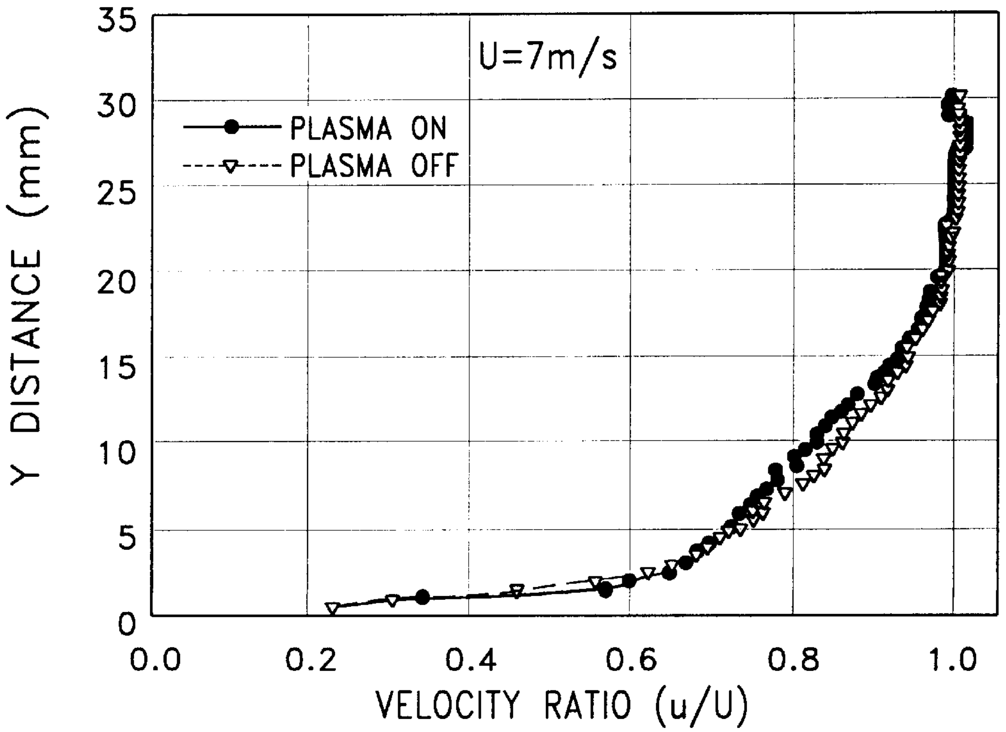
Figure 10C:
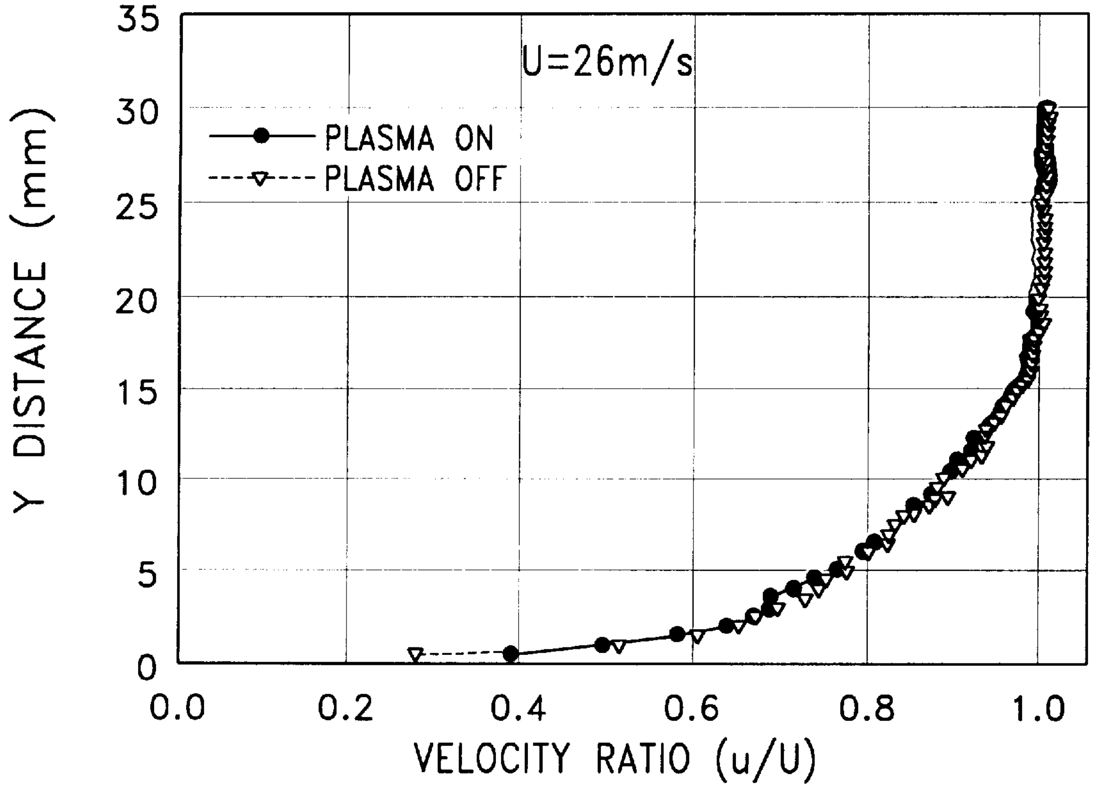

Vertical boundary layer velocity profiles were also measured with a total pressure probe on several panels with symmetric as well as asymmetric electrode configurations. FIGS. 8*a–c* present wall-normal velocity profiles for Panel C7-A (with symmetric, stream-wise electrodes) one-half way between two adjacent electrodes, for the case of laminar (a), transitional (b), and fully turbulent (c) flow at the panel leading edge, at 3 kHz and 5.1 kV rms. The probe tip was located approximately one boundary layer thickness downstream of the model over the smooth aft filler plate of the lower wall (i.e., 28 mm downstream of the panel aligned directly between two adjacent electrodes). A metallic aft plate was used for the profile measurements to aid probe initial height determination; for drag measurements, a non-metallic plate was used to minimize electrostatic drag error. FIGS. 9*a–c* present similar data, also from the stream-wise electrode configuration, with the pitot probe directly behind one of the stream-wise electrodes (i.e., 28 mm downstream of the panel aligned directly behind an electrode). FIGS. 10*a–c* show the profiles downstream of span-wise oriented electrodes on Panel C7-C, at 3 kHz and 5.0 kV rms with the pitot tube located 28 mm downstream of the last electrode.

The profiles for the stream-wise case (FIGS. 8*a–c* and 9*a–c*) show a dramatic alteration of the flow due to interaction with the plasma that diminishes with increasing velocity. There is a large acceleration of the flow near the wall and a retardation farther out. The cases of the probe between and behind the electrodes are qualitatively similar, but differ in magnitude. Smoke-wire (e.g., FIGS. 6*a–b*) and hot-wire diagnostics show that the energized, stream-wise electrode patterns effectively trip the flow, and that any between-electrode/behind-electrode differences are largely mixed out at the end of the panel. For the span-wise case in FIGS. 10*a–c*, the effect is largely limited to the laminar flow condition, with little effect in the transitional case and virtually no discernible effect in the turbulent case. (The step-wise appearance of the data in FIG. 10*a* is an error due to a mismatch between the pressure sensor and A/D converter ranges. The trend of the data is valid.)

The profiles corroborate the drag and smoke-wire data. For the stream-wise electrode case, there is a substantial retardation of the profile affecting the entire boundary layer. This increases the boundary layer momentum deficit and qualitatively corresponds to the large increase observed in the drag in FIG. 5*a*. For the span-wise electrode configuration shown in FIGS. 10*a–c*, a significant effect is evident only in the laminar regime, with a similar effect on the drag (FIG. 5*b*). For the smoke-wire flow visualization, the eruption of vortical structures observed in FIGS. 6*a* and 6*b* appears to be consistent with the flow retardation observed in the velocity profiles of FIGS. 8*a–c* and 9*a–c*.

Figure 11:
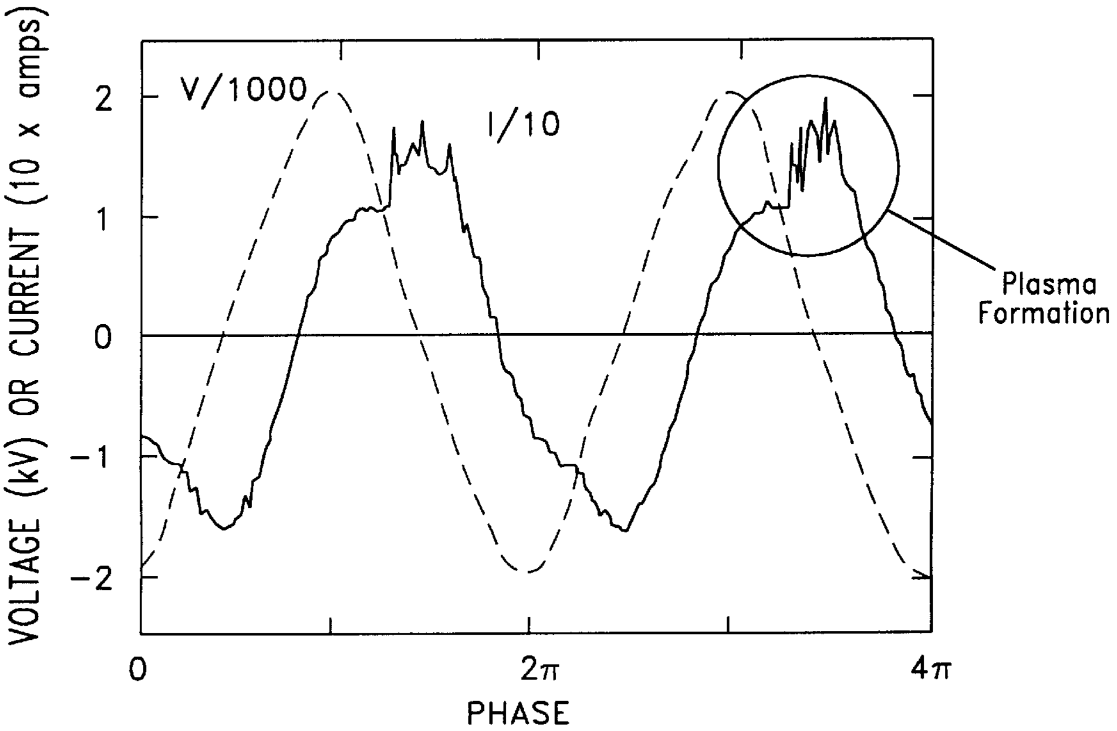
FIG. 11 shows the instantaneous RF voltage and current for a plasma panel.

FIG. 11 shows the instantaneous RF voltage and current for Panel C1-C operated at an rms voltage of 1.4 kilovolts and a frequency of 2.5 kilohertz. The voltage was measured at the power supply output with a high-voltage probe having the requisite frequency response. The current through the high-voltage power cable was measured with a high-bandwidth, toroidal current transformer with a sensitivity of 1 volt/amp. The noisy region at the positive peaks of the current waveform represents the plasma initiation, during which a classical, "DC," normal glow discharge briefly exists between the electrodes. The plasma ignition appears only once per cycle for the model and conditions portrayed in FIG. 11. For most models studied during these tests, however, plasma ignition occurred twice per cycle. There was a noticeable variability in the current waveforms for the various panels and excitation voltages.

A final observation applicable to all of the current OAUGD plasma flat panels relates to acoustics. Each panel exhibited a strong audible tone at the RF excitation frequency. The tone was present in unconfined bench-top testing of the panels as well as in the enclosed wind tunnel test section, ruling out any resonant chamber effects. It was initially suspected that the OAUGD plasma might be exciting a panel resonance. However, monolithic mounting of the panel to its baseplate did not appreciably change the pitch or intensity of the tone. The emitted sound therefore must be considered a direct coupling of the OAUGD plasma formation mechanism into radiated acoustic energy, a further indication of strong plasma-neutral gas coupling.

Drag Reduction Data

Probably the most interesting data taken during this study were those from the asymmetric panels which were designed to unidirectionally accelerate the flow. The smoke-flow visualization of FIGS. 6*a* and 6*b* with symmetric electrodes indicate an attraction of the flow toward the electrodes. If the electrodes are fabricated in an asymmetric manner, such as the geometry illustrated in FIG. 3*b*, an unbalanced paraelectric EHD body force is exerted on the plasma/flow field, and a corresponding force is exerted on the panel on which the electrodes are mounted. (The term "paraelectric" refers to the fact that the observed attraction of the smoke towards the electrode is independent of the instantaneous electric polarity of the electrode. It is used in the same sense as the more familiar phenomenon of paramagnetism). The resultant force can be in the direction of the airflow (co-flow) or opposite the free stream flow (counter-flow), depending on the orientation of the electrode asymmetry.

Figure 12:
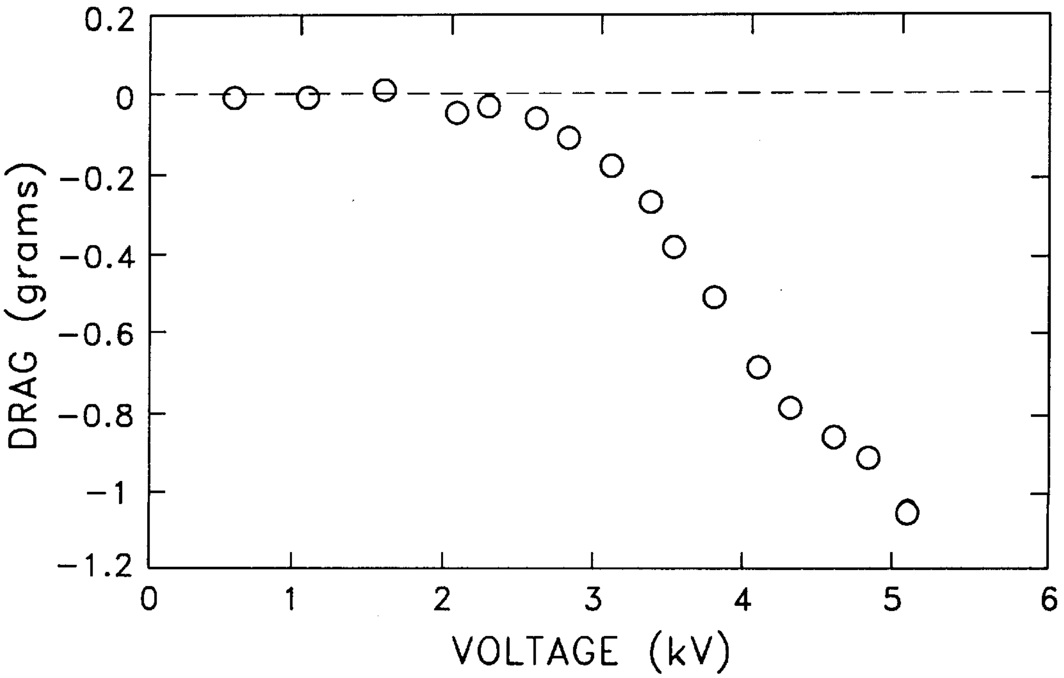
FIG. 12 illustrates the production of a force by a plasma panel mounted on the wind tunnel drag balance, but with no flow.

FIG. 12 illustrates the production of a force (thrust in this case) by Panel E6-C mounted on the wind tunnel drag balance, but with no flow. Due to previously mentioned wind tunnel modifications, the electrostatic drag correction is insignificant. The plasma was operated at 3.0 kilohertz and the electrode spacing was 8.5 mm between the centers of span-wise electrode strips each 0.5 mm wide. The asymmetric strips on the bottom of the panel were located at only one side (downstream) of the top electrode strips. These bottom strips were 3.0 mm wide, and separated stream-wise from the top strip by about 0.25 mm. This is not necessarily (and is probably not) an optimum geometrical configuration to produce thrust, but nonetheless illustrates the asymmetrical force effect.

Figure 13:
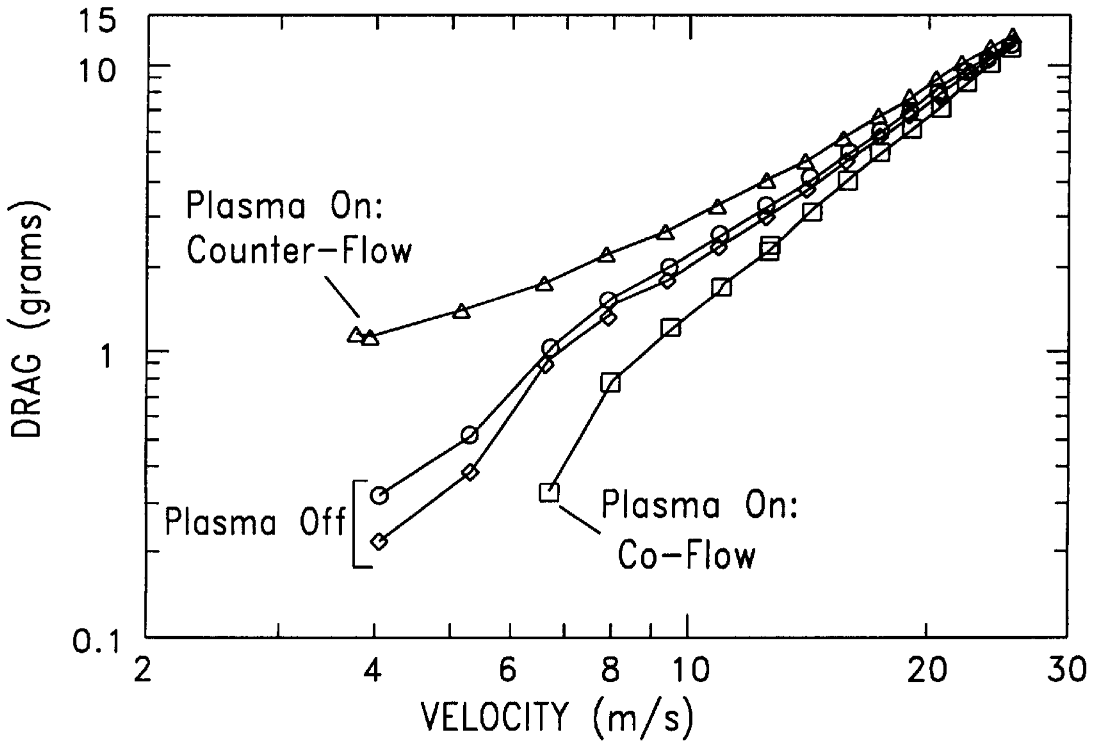
FIG. 13 presents the drag on a plasma panel over the usual laminar, transitional, and turbulent velocity ranges.

FIG. 13 presents the drag on Panel E6-C (the same model used in FIG. 12) over the usual laminar, transitional, and turbulent velocity ranges. The plasma was operated at 3.0 kilohertz and 4.0 kilovolts rms. The two curves corresponding to the unenergized cases are virtually coincident, and represent the smooth flat-plate reference drag data. The lower co-flow curve shows an (unoptimized) reduction in drag comparable to the plasma-generated thrust, where the bottom electrode strips are located downstream of the top electrode strips. The upper counter-flow curve was taken with the same panel rotated 180 degrees (i.e., so that the bottom electrode strips are located upstream of the top electrode strips) to generate a plasma-induced drag on the plate.

Figure 14:
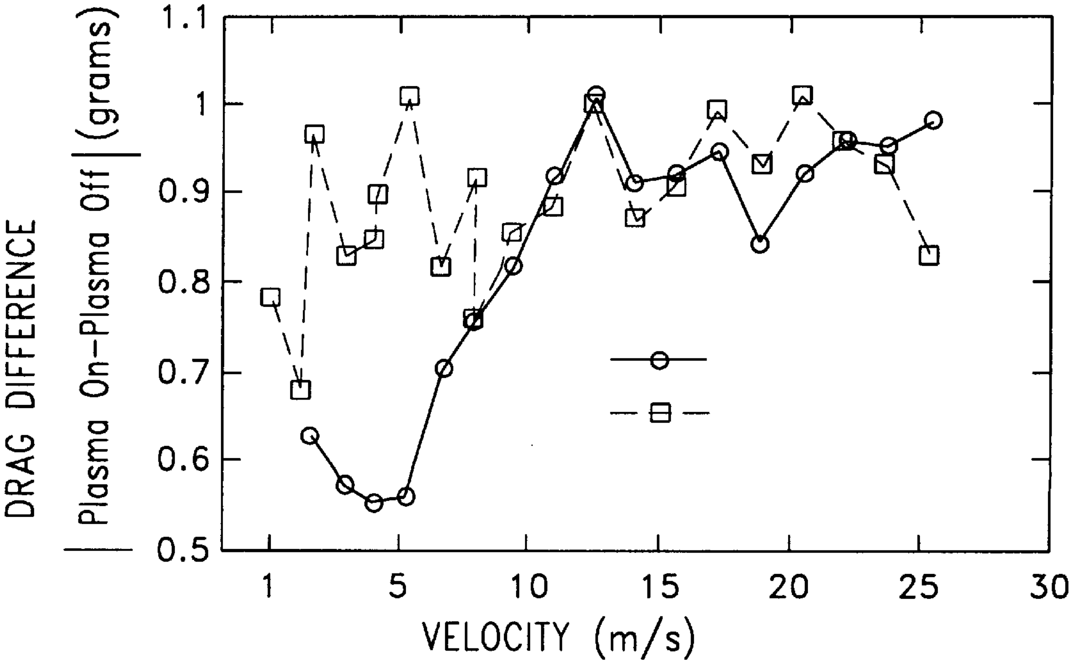
FIG. 14 shows the difference between the plasma-on and plasma-off drag for an asymmetric plasma panel in both the co-flow and counter-flow velocity fields.

FIG. 14 shows the difference between the plasma-on (4 kV, 3 kHz) and plasma-off drag for the asymmetric Panel E6-C in both the co-flow and counter-flow velocity fields. Note that the ordinate of FIG. 14 is the absolute value of the drag difference. For the counter-flow case, the $0.9\pm0.05$-gram drag increase is approximately constant across the speed range of the tunnel. This indicates that the plasma-induced, counter-flow EHD force is additive and the effect is primarily propulsive. For the case of the co-flow orientation, however, a trend exists below 10 m/s indicating a clear Reynolds number dependence. The plasma has been noted in all cases to trip the boundary layer so the Reynolds number dependency shown in FIG. 14 could be more boundary layer trip related than turbulence modification related. Nonetheless, this finding along with other data presented in this specification point to the possibility of using the newly discovered EHD forcing to target and control boundary layer turbulence.

Panel E6-C was not optimized for the EHD force. While the predominant plasma forms on the upper surface over the lower surface electrode, flow visualization has shown that a small amount of plasma forms on the opposite edge of the upper surface electrode due to field lines wrapping around to the lower electrode. The net effect is to have a large EHD force in one direction (downstream in the co-flow case) and a smaller force in the opposite direction.

Figure 15:
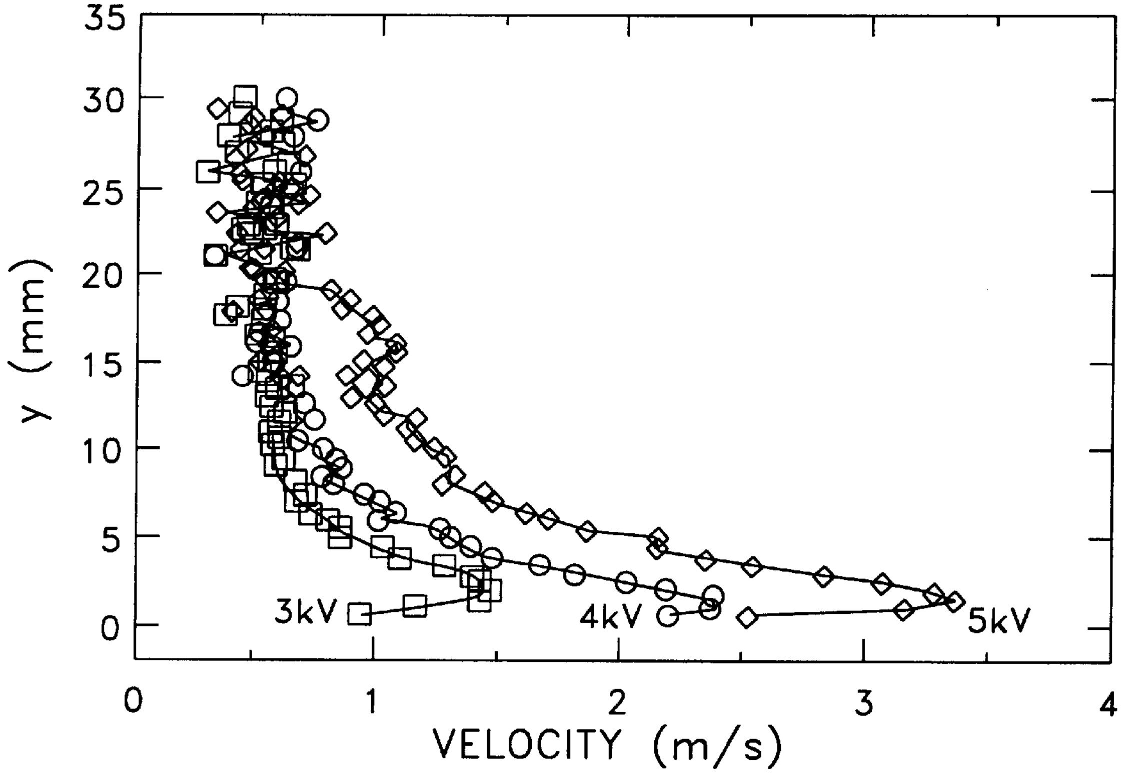
FIG. 15 shows blowing velocity profiles for an asymmetric plasma panel mounted in the wind tunnel without flow, but with the pitot tube positioned at the same location used in FIGS. 8–10.

The asymmetric Panel E6-C was mounted in the wind tunnel without flow, but with the pitot tube positioned at the same location used in FIGS. 8–10. The resulting blowing velocity profiles are shown in FIG. 15 for electrode voltages of 3, 4,and 5 kV rms (all at 3 kHz). Maximum plasma-induced velocities up to 4.0 meters/sec were observed. Particularly interesting were the induced velocities of up to 0.5 meters/sec at distances at least 3 cm from the wall, which occurred for all driving voltages.

Figure 16A:
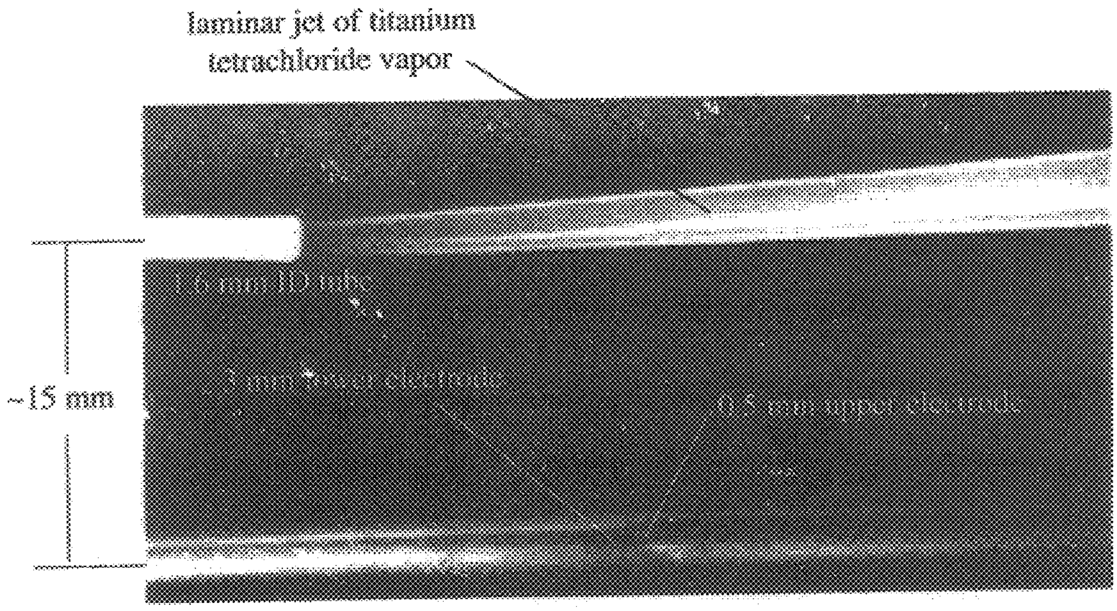
FIGS. 16*a* and 16*b* show the influence of the OAUGD plasma on a laminarjet of smoke injected in still air above a single, asymmetric electrode arrangement with the plasma is off and on, respectively.
Figure 16B:
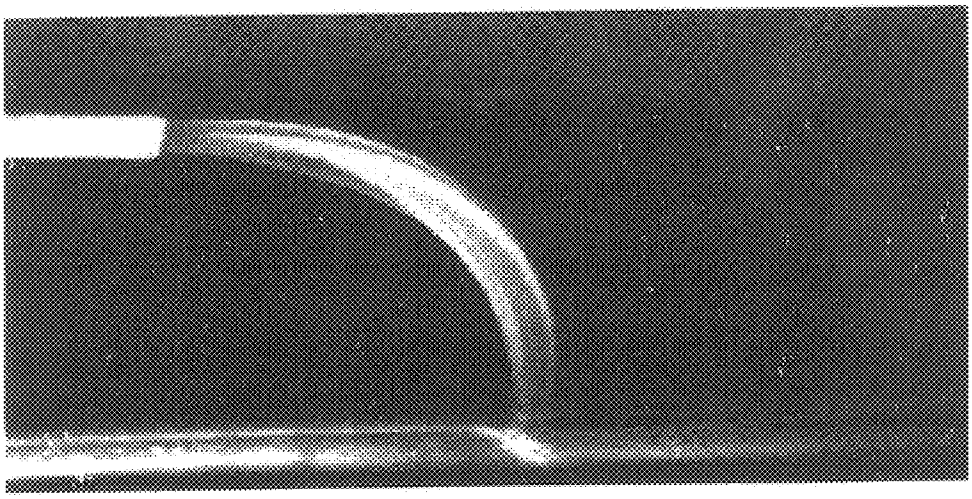

FIGS. 16*a* and 16*b* show the influence of the OAUGD plasma on a laminarjet of smoke injected in still air above a single, asymmetric electrode arrangement in which the panel has a single 0.5-mm wide electrode on the upper surface and a 3-mm wide lower electrode to the left. In FIG. 16*a*, the plasma is off, while, in FIG. 16*b*, the plasma is on with electrode voltages about 4.5 kV rms and frequency 3 kHz. The test was conducted in a still air chamber. The "smoke" in this case was actually titanium tetrachloride (a commonly used white flow marker chemical) injected manually in a slow, steady stream from a plastic squeeze bottle with a jet exit velocity estimated to be in the range of 1 to 2 m/s. The plasma is not visible in FIG. 16 due to the strong illumination required for the smoke. FIG. 16*b* shows the paraelectric forcing causing the jet to deflect towards the electrode.

In terms of a phenomenology, the flow of the smoke and the air which it marks responds to paraelectric EHD effects in the following way. In FIG. 16*b*, the flow is drawn downward by a low pressure above the low electric field gradient region of the plasma, entrained in the ion-driven plasma flow toward the region of high electric field gradient, and forced outward by the region of high (plasma stagnation) pressure along the surface of the panel. The flow is rapidly accelerated away from the region of high gas pressure and high electric field gradient (primarily to the left of the electrode due to the asymmetry but also to a lesser degree to the right as well). This effect is responsible for the blowing velocity profiles illustrated in FIG. 15.

The behavior shown in FIG. 16*b* is consistent with a pure paraelectric effect on the plasma and on the flow which it entrains. It is not a classical case of dielectrophoresis, although similarities exist. Dielectrophoresis refers to the forces on neutral, polarizable, dielectric material when subjected to a spatially non-uniform or a time-varying electric field. In the current case, no smoke or air movement is observed until sufficient voltage is reached for the plasma to initiate. This indicates a different phenomenon than dielectrophoretic behavior alone.

Accuracv of Experimental Data

The primary experimental data measured during this investigation were pressure (for velocity) and force (for drag). Pressures were measured with capacitive or piezoelectric transducers with better than 0.1% accuracy and read on 5½ digit digital voltmeters with an order of magnitude or better accuracy than the pressure transducers. Given additional sources of error such as the data reduction model, probe alignment and position, probe viscous effects, and electronic voltage offsets and noise, the overall accuracy is still estimated to be within no more than ±2% of the actual value, which was adequate for the current tests. The force on the drag balance was measured with an elastic piezoresistive force sensor with two active resistor elements. Two passive resistors were added to complete a bridge circuit. The bridge offset was amplified, filtered with a 4th-order Butterworth low-pass filter at 0.5 Hz, and calibrated against an applied stream-wise force. The resultant resolution was about 10 milligrams. The absolute, systematic error is estimated to be less than 5% of the actual value and much better for comparative measurements.

Discussion

The goals of the study leading to the present invention, as discussed in the introduction, were to demonstrate that EHD forces could be generated of sufficient magnitude to alter wall turbulence and drag, and to demonstrate that such forces can lead to a useful control mechanism. The first goal was clearly met, and was limited only by the voltage of the power supply. The latter must also be considered a success, since it has been demonstrated that EHD forcing can generate significant body forces on the neutral gas flow. The usefulness of the flow forcing demonstrated thus far will of course depend upon application-specific studies. Also, the likelihood that the observed paraelectric behavior is a second-order effect compared to polyphase electrode excitation holds further hope for useful engineering applications.

Several key questions were addressed by the diagnostics conducted during this study. The cause of the dramatic drag increase which occurs for the symmetric stream-wise electrode arrays (FIG. 5*a*) is clearly associated with formation of the symmetric stream-wise vortical structures evidenced by both the smoke wire flow visualization (FIG. 7) and the pitot tube velocity profiles (FIGS. 8 and 9). Conversely, the much smaller drag increase associated with the symmetric, span-wise arrays (FIG. 5*b*) results from the lack of stream-wise vortex formation and advance tripping of the turbulent boundary layer on the panel. For the case of the asymmetric span-wise electrode panels (e.g., Panel E6-C), the directed thrust leading to a drag increase or decrease results from the same mechanism that causes the vortex formation in the stream-wise, symmetric case. This is clear from the still air smoke flow visualization (FIG. 16) and the no-flow blowing profiles (FIG. 15).

The possibility of a local wall-heating mechanism deserves closer attention, but is not a primary mechanism responsible for the observed model behavior. The OAUGD plasma is not a high-energy density plasma, and does not generate a great deal of heat. Power input levels to the plasma were no more than about 100 mW/cm$^2$, based on the electrode array area. After several minutes of operation the panels become sensibly warm to the touch but certainly not enough to explain any of the dramatic changes in drag, velocity profiles, or smoke flow patterns. A cursory measurement of boundary layer temperature downstream of an energized model showed only a small temperature rise of several degrees Celsius. A more pertinent question would be the magnitude of the localized electron temperature within the plasma and its impact on the observed phenomena.

FIGS. 8 and 9 show that the effect on the plasma is spread across the entire boundary layer for the stream-wise symmetric electrode case. It seems clear that a major vortex-dominated mechanism is in play. This is evidenced by direct manipulation of the stream-wise flow by EHD forces in the (initially) laminar smoke wire data shown in FIG. 6.

A strong paraelectric EHD effect on boundary layer flow has been demonstrated, and opens the way to refinements and new configurations which may lead to useful applications. Specific active control includes either accelerating the flow in a steady fashion, or oscillating the flow in the span-wise direction. Oscillating a turbulent boundary layer in the span-wise direction can have a dramatic effect on reducing turbulence intensity and drag. While control of wall turbulence and drag was the subject of the current study, other possibilities in areas such as heat transfer, lift enhancement, and flow separation control are also of interest. The EHD approach of the present invention has the ability to move a neutral gas with EHD forcing to reduce or enhance drag, or significantly alter the velocity profile of the boundary layer.

Paraelectric Gas Flow Accelerator

The above-described research has led to the development of a conceptual understanding of, and an analytical theory for, an electrohydrodynamic (EHD) method of neutral gas flow control. This paraelectric EHD body force arises when the applied RF electric fields act on the net charge density of the OAUGD or other plasma, to provide a body force on the plasma capable of accelerating the neutral gas to velocities up to, for example, 10 meters per second. The theory of this method is outlined below. It may be used to provide lightweight, robust, and laminar flow pumping by electrohydrodynamically manipulating atmospheric plasmas and their neutral background gas. This electrohydrodynamic flow control mechanism has been demonstrated to work at one atmosphere using the OAUGD plasma for its implementation, although other types of plasmas and other pressures might also work.

The EHD effects are best studied with an individual particle rather than a continuous fluid formalism. One theoretical approach to understanding the EHD effects required for flow control is the Lorentzian formalism, in which each collision of the ions or electrons gives up to the neutral background gas all the momentum and energy which they gained, on the average, from the electric field since their last collision. Another conceptual aid to understanding EHD phenomena is to utilize the fact that electric field lines terminate on free charges, or on charged conductors, and that these electric field lines act like rubber bands in tension to pull charges of opposite sign together.

In plasmas, including the OAUGD plasmas, that give rise to flow control effects, this polarization electric field causes the charges, the plasma, and the background gas to move toward regions with shorter electric field lines and stronger electric fields, i.e., the plasma will move paraelectrically toward increasing electric field gradients, and drag the neutral gas along with it as a result of the very frequent ion-neutral and electron-neutral collisions. In such atmospheric Lorentzian plasmas as the OAUGD plasma, the large ratio of neutrals to ions does not "dilute" the momentum lost by the ions, because the large number of collisions per second compensates for the small ionization fraction.

In atmospheric air, the ion collision frequency is about 7 GHz; that of electrons about 5 THz. These high collision frequencies are why the electric fields are well coupled to the neutral gas through the ion/electron populations, and why the induced neutral gas velocities can be comparable to the ion mobility drift velocity.

Paraelectric Gas Flow Control

The paraelectric EHD body force arises when the applied electric fields act on the net charge density of the OAUGD plasma, to provide a body force on the plasma capable of accelerating the neutral gas to velocities up to, for example, 10 meters per second. A derivation of this mechanism is presented in the following.

The electrostatic body force $F_o$ on a plasma with a net charge density $\rho_\cup$ is given by Equation (2) as follows:

$$F_o=\rho_\cup E \text{ newtons/m}^3 \tag{2}$$

where E is the electric field strength in volts per meter. The net charge density $\rho_\cup$ is given by Equation (3) as follows:

$$\rho\cup=e(Zn_\varnothing-n_\supset) \text{ coulombs/m}^3 \tag{3}$$

where e is the elementary charge of an electron, Z is the average charge state of the ions, $n_\in$ is the ionic number density, and $n_\supset$ is the electron number density. The net charge density $\rho_\cup$, which is expressed in coulombs per cubic meter of plasma, is the difference between the ionic and electron number densities, and is a term that is usually ignored in quasineutral theoretical formulations. This net charge density is related to the electric field in the plasma through Poisson's equation, which is presented in Equation (4) as follows:

$$\nabla\cdot E=\frac{\rho_\upsilon}{\varepsilon_\epsilon} \tag{4}$$

where $\epsilon_\in$ is the electrical permittivity of free space.

If Equation (4) is substituted into Equation (2), the electrostatic body force $F_o$ is given by Equation (5) as follows:

$$F_o=\varepsilon_\epsilon E\nabla\cdot E=\frac{1}{2}\varepsilon_\epsilon\nabla\cdot E^{''}\Rightarrow\frac{d}{dx}\left(\frac{1}{2}\varepsilon_\epsilon E^{''}\right) \tag{5}$$

The last two terms in Equation (5) are an equality for the one-dimensional formulation of interest in the present application. The expression in the parentheses in the last term of Equation (5) is the electrostatic pressure $\rho_o$ given by Equation (6) as follows:

$$p_o=\frac{1}{2}\varepsilon_\epsilon E^{''} \text{ newtons/m}^2 \tag{6}$$

which is numerically and dimensionally the energy density, as well having the units of newtons per square meter, or pressure. In the present formulation, it is more useful to regard $P_E$ as a pressure, because of its influence on the neutral gas flow. Using Equation (6), Equation (5) may be written as Equation (7) as follows:

$$F_E=\frac{d}{dx}(p_E) \text{ newtons/m}^2 \tag{7}$$

The body force represented by Equation (7) results because the electrostatic pressure is transmitted to the ions and electrons by acceleration in the electric field, and the momentum acquired by the ion/electrons is then transmitted in turn to the neutral gas by Lorentzian collisions.

Figure 17:
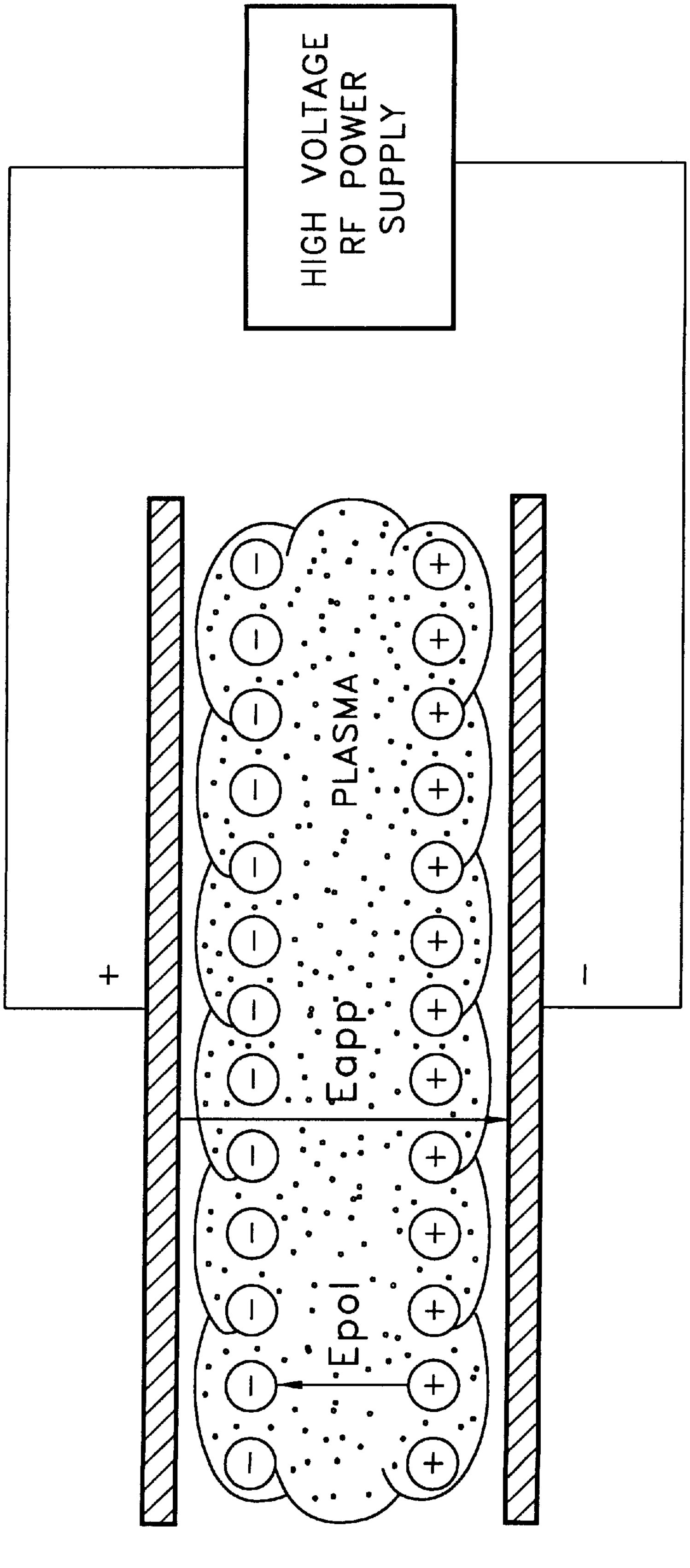
FIG. 17 shows a plasma confined between parallel plate electrodes.

The physical processes responsible for making the electrostatic pressure effective can be visualized with the aid of FIG. 17, which shows a slab plasma confined between parallel plates. This slab plasma will polarize in the manner indicated, resulting in a polarization electric field in the bulk of the plasma in which the electric field lines terminate on the charges at the plasma boundary. These electric field lines act like rubber bands in tension and attempt to draw the two sides of the plasma together (hence the electrostatic pressure), but the plasma will remain in equilibrium as long as the external electric field remains in place. There are no electric field gradients, so the plasma will have no tendency to move to the right or left.

Figure 18:
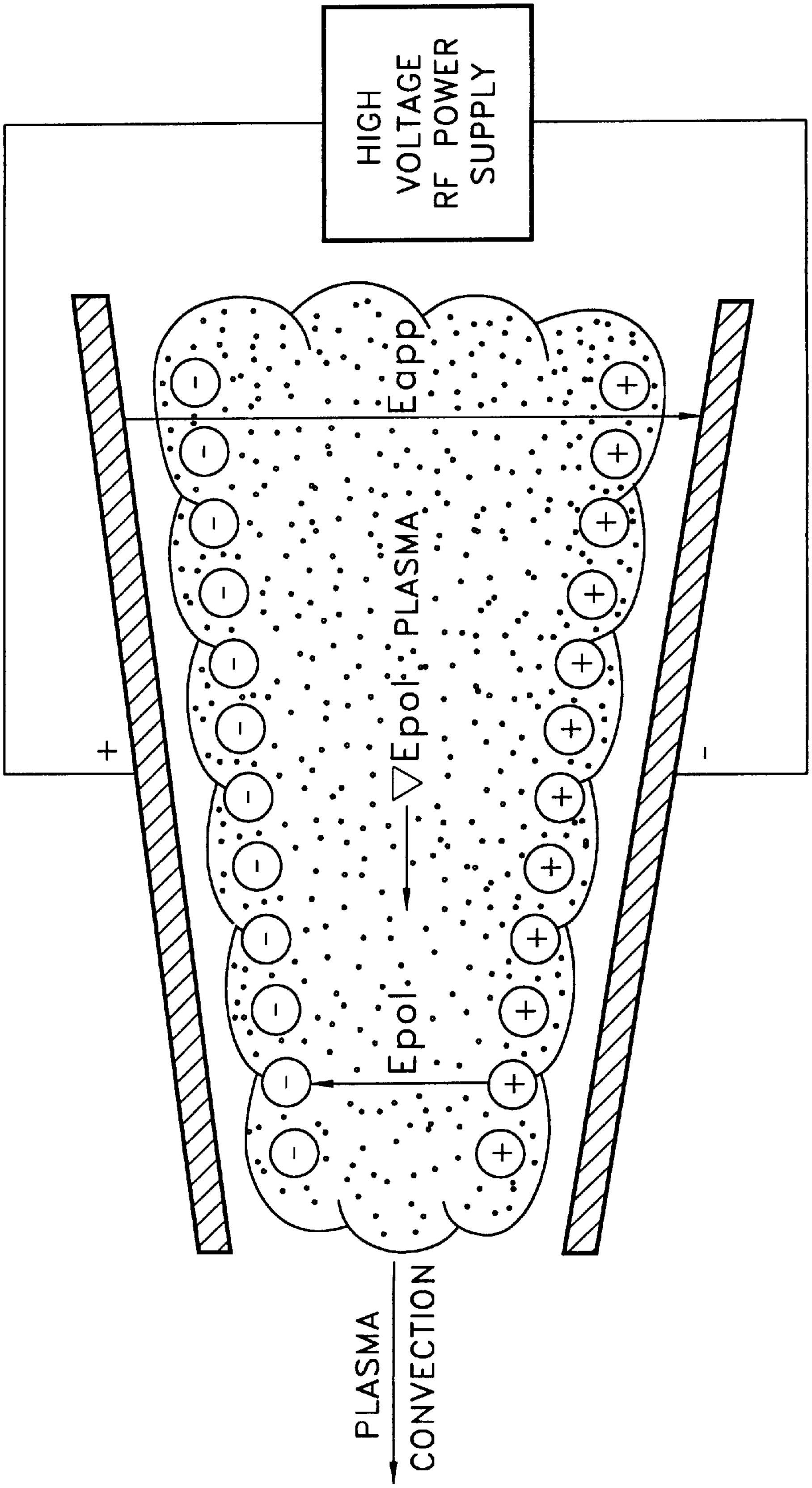
FIG. 18 shows a plasma connected between tilted plate electrodes.

If the geometry of FIG. 17 is slightly changed by tilting the two flat electrodes as shown in FIG. 18, an electric field gradient will exist horizontally, and the plasma will be accelerated toward the left by the tendency of the electric field lines to contract, in the direction of increasing electric field gradient. This can be understood as an imbalance in electrostatic pressure which provides the body force in Equation (7) above. The Lorentzian collisions of the ions and the electrons with the neutral gas will drag it also to the left in FIG. 18, along with the plasma. The electrostatic body force is independent of the direction of the electric field (because of the $E^2$ dependence in Equation (6)), and thus is as strong in RF electric fields as in DC. Furthermore, the electrostatic body force is independent of the sign of the charge species being accelerated (they both move in the same direction).

The ordinary gasdynamic pressure $P_g$ of the neutral gas is given by Equation (8) as follows:

$$P_g = nkt \tag{8}$$

where n is number density of the neutral gas, k is the Boltzmann constant, and t is the temperature of the gas. If viscosity forces, centrifugal forces, etc. are neglected, the body forces due to gasdynamic and electrostatic gradients will be approximately in equilibrium, as presented in Equation (9) as follows:

$$\nabla p_g + \nabla p_E = \frac{d}{dx}(p_g + p_E) = 0 \tag{9}$$

As a result, the sum of the gasdynamic and electrostatic pressures are approximately constant, as represented by Equation (10) as follows:

$$P_g + P_E = \text{constant} \tag{10}$$

Substituting Equations (6) and (8) into Equation (10) yields an approximate relation between the gasdynamic parameters and the electric field, as present in Equation (11) as follows:

$$nkT + \frac{\varepsilon_0}{2}E^2 = \text{constant} \tag{11}$$

Equation (11) predicts that, in regions of high electric field (i.e., $P_E$ large), the neutral gas pressure $P_g$ is small, reflecting a low-pressure region that will cause an inflow of surrounding higher pressure gas. This pumping action is a paraelectric effect by which the plasma ions and electrons, and the neutral gas to which they are coupled by collisions, are drawn to regions of high electric field gradient.

A potential advantage of the paraelectric EHD flow acceleration mechanism implied by the balance of gasdynamic and electrostatic pressures described in Equation (11), is that the required electric fields can be set up with a very simple, robust, and lightweight system of electrodes. Such a flow acceleration mechanism involves no moving parts, and, as long as an air plasma is used, it requires no external input of gases or liquids, nor does it produce any solid waste or unwanted byproducts. A flow acceleration mechanism using the OAUGD plasma therefore offers the potential advantages of a unit without moving parts, with potentially great reliability, and lightness of weight, all of which are very desirable in aeronautical and industrial applications.

The velocity due to paraelectric gas flow acceleration effects which are produced by the OAUGD plasma can be derived in the following way. The electrostatic pressure given by Equation (6) above will accelerate the neutral gas to a velocity $v_0$, which will lead to a stagnation pressure $P_s$ equal to the electrostatic pressure, as given by Equation (12) as follows:

$$p_S = \frac{1}{2}\rho v_0^2 = \frac{1}{2}\varepsilon_0 E^2 \tag{12}$$

In Equation (12), the electrostatic pressure is assumed to compress the gas to a stagnation (or dynamic) pressure given by the middle term of the equation. When the gas is accelerated, a time-reversed version of stagnated gas flow will occur. Solving Equation (12) for the induced neutral gas flow velocity $v_0$ yields Equation (13) as follows:

$$v_0 = E\sqrt{\frac{\varepsilon_0}{\rho}} \text{ m/sec} \tag{13}$$

In the OAUGD plasma flat panel used in the flow visualization experiments, the electric field E was approximately $10^6$ V/m. When these values of electric field and mass density are substituted into Equation (13), the predicted neutral gas flow velocity of Equation (14) is obtained as follows:

$$v_0 = 10^6\sqrt{\frac{8.854\times 10^{-12}}{1.3}} = 2.6 \text{ meters/sec} \tag{14}$$

Exploratory Experiments With Paraelectric Gas Flow Acceleration

FIGS. 16*a–b* show the results of a smoke flow test which illustrates the paraelectric effects under consideration here. In FIG. 16*a*, a jet of low velocity (about 1 m/sec) smoke flows horizontally 1.5 cm above a surface with a single, asymmetric, unenergized electrode located on it. In FIG. 16*b*, the electrode is energized. The geometry of the electrode is asymmetric (as in FIG. 3*b*) in such a way that the neutral gas flow is pumped to the left with a velocity of a few meters per second. The descent of the smoke jet to the surface occurs because of the low-pressure region generated by paraelectric effects in the vicinity of the plasma. The plasma is confined to within about 1–2 mm of the panel surface, and extends no more than about 5 millimeters from the asymmetric electrode.

In interpreting FIGS. 16*a–b*, it is important to realize that the smoke consists of titanium dioxide particles, a standard flow visualization technique used in the field of aerodynamics. The particles are not charged, and the smoke serves only as a passive flow marker. Furthermore, electrophoretic or dielectrophoretic effects involving the smoke are much too small to produce the observed deflection of the gas jet. Increased or decreased velocities, and other aerodynamic phenomena observed in the wind tunnel tests (such as vortex formation) exist whether or not the smoke is present. A plasma, such as the OAUGD plasma, must be present in order to observe the EHD induced flow acceleration. The mere presence of a strong electric field without a plasma present is not sufficient to produce the induced flow velocities.

The induced neutral gas flow velocity predicted by Equation (13) is a function of the mass density of the working gas (1.3 kg per cubic meter for atmospheric air at standard temperature and pressure (STP)), and it is also a function of the electric field E. In the OAUGD plasma, the electrode geometry of the asymmetric paraelectric flow panel of FIG. 3*b* is fixed, and hence the electric field (and the flow velocity) are directly proportional to the applied voltage. In the OAUGD plasma flat panel used in the flow visualization experiments, the electric field E is approximately $10^6$ V/m. When these values of electric field and mass density are substituted into Equation (13), the predicted neutral gas flow velocity in Equation (14) of 2.6 meters/sec is obtained.

Figure 19:
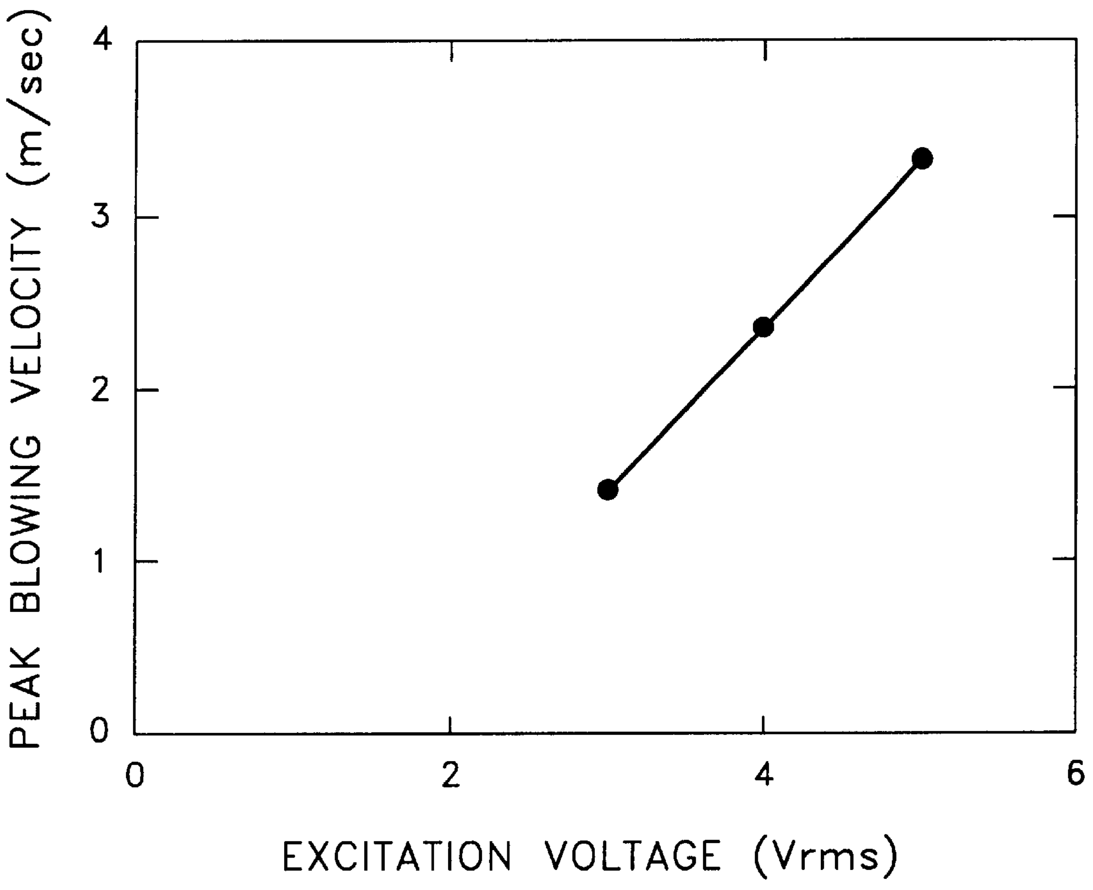
FIG. 19 shows a graphical representation of the maximum blowing velocities of FIG. 15 plotted as a function of the excitation voltage.

The blowing velocities near the surface of a panel covered with asymmetric electrodes similar to those in FIG. 3*b* were measured with a pitot tube above the surface of the panel, and are plotted in FIG. 15. The maximum velocities observed with the pitot tube are shown plotted in FIG. 19 as a function of the excitation voltage. This figure shows induced neutral gas velocities of several meters per second, consistent with Equation (14), and it shows that, above a threshold voltage at which the plasma initiates, the neutral gas velocity is directly proportional to the excitation voltage, again consistent with the linear dependence on electric field predicted by Equation (13).

Applications

The present invention can be embodied in a paraelectric gas flow generator (PGFG), which, in a general sense, is a new type of fan or blower. Utilizing the plasma-generation method of the OAUGD plasma and a unique surface electrode geometry (see, e.g., FIG. 3*b*), both the active species of the plasma and the surrounding neutral gas can be accelerated or decelerated. The application of the PGFG regarding neutral gas and plasma-produced active species is limited only by the amount of voltage that can be safely applied and issues regarding the desirability of the plasma-produced active species.

At least two types of design are envisioned: (1) sheets or strips with PGFG electrodes applied to an existing surface, and (2) surfaces fabricated with PGFG electrodes built in. These PGFG surfaces could either directly manipulate the gases near or around a surface, or be placed inside an apparatus to direct a gas or plasma-active species.

The electrodes can be positioned both above a dielectric insulating panel, preferably thin, or if desired, one on each side of the panel. The electrodes can be bare, exposed to the air and plasma stream or they can be coated or embedded, as may best suit the desired use of the apparatus.

The present invention can be used to implement PGFGs for numerous different applications, including the following.

An aerodynamic actuator for increasing/decreasing aerodynamic drag or turbulence, influencing flow separation, altering heat flow, or affecting aerodynamic transition near or on a surface, particularly aircraft, but also other gas flow control applications.

To blow or suck a gas through a conduit. The conduit could be circular, square, or irregular in shape. Potential applications range in size from small medical tubing to as large as air ducts (plasma sterilization), flue stacks, industrial exhaust stacks, and pipelines (plasma decontamination, plasma chemistry, and/or enhanced flow). Additionally, the EHD flow control of the present invention can be used for gas flow and active species control in plasma deposition and etching reactors (not necessarily limited to one atmosphere of pressure).

To manipulate active species for the treatment of surfaces near the PGFG surface (either moving or stationary in reference to the PGFG surface) for such applications as plasma cleaning, sterilization, deposition, etching, alteration in wettability, printability, and adhesion.

A thruster to provide momentum/movement to an object with the PGFG surface.

Inducing low-speed laminar flow in low-speed wind tunnels, replacing fans and other drivers with moving parts which introduce vorticity into the flow.

Replacing squirrel-cage blowers, fans, etc. for the silent, laminar, vibration-free pumping of air without any moving parts in heating, ventilating, and air conditioning (HVAC) systems. Acoustic noise arising from vorticity in the flow, and vibration from the fans, etc. limits the velocity in HVAC ducts to values ranging from about 3 to about 15 meters/sec. Driving the flow with paraelectric acceleration may allow the flow to be speeded up to velocities not possible with conventional HVAC technology because of the tendency of these conventional technologies to generate unacceptable noise levels. In such applications, the OAUGD plasma asymmetric panels are operated at frequencies above or below the limit of human hearing (because they may act like acoustic loudspeakers), and ozone or any other potentially toxic plasma active species should be reduced to low levels.

To pump the recirculating air in hospital operating room laminar air flow installations. The potential ability to pump the air without introducing vorticity would better avoid mixing of the sterile air of the operating field with outside, less sterile air. Passage of the laminar airflow through the asymmetric pumping plasma also would tend to sterilize it, or at least reduce the burden of potentially infectious microorganisms.

To pump recirculating or single-pass air or other gases in remote exposure reactors, including "leaf-blower" portable backpack units used to decontaminate surfaces compromised by chemical or biological warfare agents. This has the advantage that the same OAUGD plasma which provides active species for sterilization or decontamination also pumps the gas flow, eliminating the need for rotary fans or blowers, and in fact, allowing such a remote exposure reactor to operate without any moving parts.

To pump the input working gases over workpieces of a OAUGD plasma reactor to control dwell time, uniformity of effect, uniformity of the OAUGD plasma, formation of dust and oils, deposition of dust or oils, and to maximize the utilization of rare or expensive feed gases. Such pumping of feed gases could be done outside the OAUGD plasma reactor, or on the surface of the chuck or baseplate on which the workpieces are located. This paraelectric effect should be useful at all background pressures, including greater than one atmosphere, and the 1.0 millitorr to 10 torr range normally used in microelectronic deposition and etching.

To pump feed and effluent gases in plasma-assisted chemical vapor deposition, and in ordinary chemical vapor deposition reactors, at all pressures from 1 millitorr to 10 atmospheres. This would be particularly useful in those chemical reactors in which vertical mixing is not desired, and the reaction must proceed in a laminar flow.

For "executive toys" in which smoke or plasma gas flow effects amuse the user.

To provide gas mixing and/or axial pressure equalization in high-power lasers energized by DC plasma discharges at any pressure.

To provide animated effects in "neon" advertising signs or related two-dimensional effects in or on a plasma panel.

To provide a control mechanism in pneumatic flow control devices operating at a wide range of pressures (millitorr to several atmospheres).

Flow separation control on airfoils (including airplane wings, propeller blades, and compressor vanes) and gas compressor or engine nacelle inlets or other aerodynamic bodies by direct momentum augmentation. By using PGFGs to accelerate retarded (i.e., slowly moving) flow close to the flow surface in the direction of mean flow, the tendency of the flow to separate under adverse pressure gradient conditions, can be lessened or altogether prevented.

Flow separation control on airfoils (including airplane wings, propeller blades, and compressor vanes) and gas compressor or engine nacelle inlets or other aerodynamic bodies by stream-wise vortex creation. By using PGFGs to create stream-wise oriented vortices close to the flow boundary, high-speed fluid outside of the boundary layer is brought close to the wall to accelerate flow in that region. The effect of this on a retarded flow close to the wall under adverse pressure gradient conditions is to reduce the tendency of the flow to separate or prevent flow separation altogether.

Flow separation control on airfoils (including airplane wings, propeller blades, and compressor vanes) and gas compressor or engine nacelle inlets or other aerodynamic bodies by turbulent tripping of an initially laminar boundary layer. A turbulent boundary layer is known to be more resistant to flow separation than a laminar boundary layer under otherwise equivalent mean flow conditions. PGFGs are very effective in tripping boundary layer flow. The effect of this on a retarded flow close to the wall under adverse pressure gradient conditions is to reduce the tendency of the flow to separate or prevent flow separation altogether.

Flow mixing augmentation by stream-wise vortex creation. Many industrial processes including combustion rely on the mixing of different gas streams. Stream-wise vortices introduced into such streams using devices based on the OAUGD plasma would effectively promote mixing.

Flow mixing augmentation by turbulent tripping of an initially laminar boundary layer. Many industrial processes including combustion rely on the mixing of different gas streams. Tripping initially laminar streams to turbulence using devices based on the OAUGD plasma would effectively promote mixing.

Heat transfer augmentation by stream-wise vortex creation. Heat transfer from solid boundaries to a gas is highly dependent upon nature of the boundary layer flow. By introducing stream-wise vortices into the flow with PGFGs, hotter (or colder) fluid in the stream away from the wall is brought close to the colder (or hotter) surface thereby promoting more heat transfer.

Heat transfer augmentation by turbulent tripping of an initially laminar boundary layer. Heat transfer from solid boundaries to a gas is highly dependent upon nature of the boundary layer flow. By tripping of an initially laminar boundary layer to turbulence with PGFGs, hotter (or colder) fluid in the stream away from the wall is brought close to the colder (or hotter) surface thereby promoting more heat transfer.

Input of any arbitrary frequency, amplitude, or shape fluid disturbances into flows for the purpose of exciting specific fluid instability modes. Certain flows, particularly laminar flows, are known to exhibit various flow instabilities when excited by the proper external disturbances. Such disturbances can promote flow vortices and/or turbulence. PGFGs may be used to generate such input disturbances.

Any of the above applications used in either steady-state or feed-back/feed-forward control schemes or other applications where the PGFG is automatically or manually controlled to operate based on some feature of the aerodynamic flow.

Any of the above applications used in subsonic, transonic, supersonic, or hypersonic flow regimes.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for generating a flow in gas, comprising:

(a) a substrate;

(b) a first plurality of electrodes configured on the substrate;

(c) a second plurality of electrodes configured on the substrate, wherein each electrode in the second plurality is positioned along a first direction between a pair of adjacent electrodes in the first plurality such that said each electrode is closer to one electrode of the pair of the adjacent electrodes than to another electroed of the pair of adjacent electrodes; and (d) a voltage generator configured to the first and second pluralities of electrodes and adapted to apply a voltage to the first and second pluralities of electrodes to generate a discharge plasma in the gas located on at least one side of the substrate adjacent to one of the pluralities of electrodes, wherein the relative positioning of the first and second pluralities of electrodes along the first direction results in a force being imparted onto the gas parallel to the first direction.

2. The invention of claim 1, wherein force is imparted onto active species in the discharge plasma which in turn imparts force onto neutral background gas.

3. The invention of claim 1, wherein the substrate is made of a dielectric material.

4. The invention of claim 1, wherein:

the first plurality of electrodes is a set of parallel electrode strips mounted onto a first side of the substrate; and the second plurality of electrodes is a set of parallel electrode strips mounted onto a second side of the substrate.

5. The invention of claim 4, wherein the first and second pluralities of parallel electrode strips are mounted perpendicular to the first direction.

6. The invention of claim 1, wherein the voltage generator generates an AC voltage of less than about 20 kilovolts with a frequency of less than about 20 kilohertz.

7. The invention of claim 1, wherein the gas has a pressure of about one atmosphere.

8. The invention of claim 7, wherein the discharge plasma is a one-atmosphere, uniform glow discharge (OAUGD) plasma.

9. The invention of claim 1, wherein the force imparted onto the gas accelerates or decelerates the gas.

10. The invention of claim 1, wherein:

force is imparted onto active species in the discharge plasma which in turn imparts force onto neutral background gas;

the substrate is made of a dielectric material;

the first plurality of electrodes is a set of parallel electrode strips mounted onto a first side of the substrate;

the second plurality of electrodes is a set of parallel electrode strips mounted onto a second side of the substrate;

the first and second pluralities of parallel electrode strips are mounted perpendicular to the first direction;

the voltage generator generates an AC voltage of less than about 20 kilovolts with a frequency of less than about 20 kilohertz;

the gas has a pressure of about one atmosphere; and the discharge plasma is a one-atmosphere, uniform glow discharge (OAUGD) plasma.

11. A method for generating a flow in gas, comprising the steps of:

(a) providing a substrate configured with first and second pluralities electrodes, wherein each electrode in the second plurality is positioned along a first direction between a pair of adjacent electrodes in the first plurality such that said each electrode is closer to one electrode of the pair of the adjacent electrodes than to another electrode of the pair of adjacent electrodes; and (b) applying a voltage to the first and second pluralities of electrodes to generate a discharge plasma in the gas located on at least one side of the substrate adjacent to one of the pluralities of electrodes, wherein the relative positioning of the first and second pluralities of electrodes along the first direction results in a force being imparted onto the gas parallel to the first direction.

12. The invention of claim 11, wherein force is imparted onto active species in the discharge plasma which in turn imparts force onto neutral background gas.

13. The invention of claim 11, wherein the substrate is made of a dielectric material.

14. The invention of claim 11, wherein:

the first plurality of electrodes is a set of parallel electrode strips mounted onto a first side of the substrate; and the second plurality of electrodes is a set of parallel electrode strips mounted onto a second side of the substrate.

15. The invention of claim 14, wherein the first and second pluralities of parallel electrode strips are mounted perpendicular to the first direction.

16. The invention of claim 11, wherein the voltage is an RF voltage of less than about 20 kilovolts with a frequency of less than about 20 kilohertz.

17. The invention of claim 11, wherein the gas has a pressure of about one atmosphere.

18. The invention of claim 17, wherein the discharge plasma is a one-atmosphere, uniform glow discharge (OAUGD) plasma.

19. The invention of claim 11, wherein the force imparted onto the gas accelerates or decelerates the gas.

20. The invention of claim 11, wherein:

force is imparted onto active species in the discharge plasma which in turn imparts force onto neutral background gas;

the substrate is made of a dielectric material;

the first plurality of electrodes is a set of parallel electrode strips mounted onto a first side of the substrate;

the second plurality of electrodes is a set of parallel electrode strips mounted onto a second side of the substrate;

the first and second pluralities of parallel electrode strips are mounted perpendicular to the first direction;

the voltage is an RF voltage of less than about 20 kilovolts with a frequency of less than about 20 kilohertz;

the gas has a pressure of about one atmosphere; and the discharge plasma is a one-atmosphere, uniform glow discharge (OAUGD) plasma.

21. The invention of claim 11, wherein the method is used to increase or decrease aerodynamic drag or turbulence.

22. The invention of claim 11, wherein the method is used to control the flow of the gas during flow separation.

23. The invention of claim 11, wherein the method is used to alter heat flow.

24. The invention of claim 11, wherein the substrate has a form of a conduit and the method is used to move the gas through the conduit.

25. The invention of claim 24, wherein the conduit is one of medical tubing, an air duct, a flue stack, an industrial exhaust stack, or a pipeline.

26. The invention of claim 11, wherein the method is used to manipulate active species for treatment of surfaces located near the substrate, wherein the treatment is one of plasma cleaning, sterilization, deposition, etching, alteration in wettability, alteration in printability, and alteration in adhesion.

27. The invention of claim 11, wherein the method is used to provide momentum to the substrate.

28. The invention of claim 11, wherein the method is used to induce low-speed laminar flow in a low-specd wind tunnel.

29. The invention of claim 11, wherein the method is used for pumping of air in a heating, ventilating, and air conditioning (HVAC) system.

30. The invention of claim 11, wherein the method is used to pump recirculating air in a hospital operating room laminar air flow installation.

31. The invention of claim 11, wherein the method is used to pump recirculating or single-pass air or other gases in a remote exposure reactor.

32. The invention of claim 31, wherein the remote exposure reactor is used to decontaminate surfaces compromised by chemical or biological warfare agents.

33. The invention of claim 11, wherein the method is used to pump input working gases over workpieces of a OAUGD plasma reactor to control dwell time, uniformity of effect, uniformity of the OAUGD plasma, formation of dust and oils, deposition of dust or oils, or to maximize utilization of rare or expensive feed gases.

34. The invention of claim 11, wherein the method is used to provide gas mixing or axial pressure equalization in a high-power laser energized by a plasma discharge.

35. The invention of claim 11, wherein the method is used to provide animated effects in an advertising sign or related two-dimensional effects in or on a plasma panel.

36. The invention of claim 11, wherein the method is used to provide a control mechanism in a pneumatic flow control device.

37. The invention of claim 11, wherein the method is used for flow separation control on airfoils, gas compressor inlets, engine nacelle inlets, or other aerodynamic bodies by direct momentum augmentation, stream-wise vortex creation, or turbulent tripping of an initially laminar boundary layer.

38. The invention of claim 11, wherein the method is used for flow mixing or heat transfer augmentation by streamwise vortex creation or turbulent tripping of an initially laminar boundary layer.

39. The invention of claim 11, wherein the method is used to input a fluid disturbance into a flow for purpose of exciting a specific fluid instability mode.

40. The invention of claim 11, wherein the method is used in either a steady-state or a feed-back/feed-forward control scheme where the method is automatically or manually controlled to operate based on some feature of the flow.

* * * * *

UNITED STATES PATENT AND TRADEMARK OFFICE

CERTIFICATE OF CORRECTION

PATENT NO. : 6,200,539 B1
DATED : March 13, 2001
INVENTOR(S) : Daniel M. Sherman, Stephen P. Wilkinson, and J. Reece Roth It is certified that error appears in the above-identified patent and that said Letters Patent is hereby corrected as shown below:

Title page,
Item [73], Assignee, add the following assignee:

-- National Aeronautics and Space Administration, Washington, DC. --

Signed and Sealed this

Twentieth Day of November, 2001

*Attest:*

Nicholas P. Godici

NICHOLAS P. GODICI

*Attesting Officer*

*Acting Director of the United States Patent and Trademark Office*